United States Patent
Yamamoto et al.

(10) Patent No.: US 7,340,217 B2
(45) Date of Patent: Mar. 4, 2008

(54) POSITIONAL INFORMATION PROVIDING APPARATUS COMMUNICATION TERMINAL MOBILE COMMUNICATION TERMINAL AND POSITIONAL INFORMATION PROVIDING METHOD

(75) Inventors: Hiroyuki Yamamoto, Tokyo (JP);
Kaoru Nakajima, Yokohama (JP);
Kazunori Kosuge, Yokohama (JP);
Katsutoshi Murata, Kunitachi (JP);
Hiroyuki Menjo, Kawasaki (JP);
Tsuyoshi Iwamoto, Nara (JP)

(73) Assignee: NTT DoCoMo, Inc., Tokyo (JP)

( * ) Notice: Subject to any disclaimer, the term of this patent is extended or adjusted under 35 U.S.C. 154(b) by 68 days.

(21) Appl. No.: 10/129,567

(22) PCT Filed: Sep. 5, 2001

(86) PCT No.: PCT/JP01/07683

§ 371 (c)(1),
(2), (4) Date: Oct. 15, 2002

(87) PCT Pub. No.: WO02/21873

PCT Pub. Date: Mar. 14, 2002

(65) Prior Publication Data
US 2003/0109265 A1    Jun. 12, 2003

(30) Foreign Application Priority Data
Sep. 8, 2000  (JP)  .............................. 2000-274214

(51) Int. Cl.
*H04M 1/66*   (2006.01)
*H04M 3/42*   (2006.01)
*H04B 7/005*  (2006.01)
*H04L 9/12*   (2006.01)
*H04Q 7/20*   (2006.01)

(52) U.S. Cl. ................. 455/67.11; 455/404.2; 455/456.2; 455/456.3; 342/387; 342/457

(58) Field of Classification Search ................ 455/405, 455/406, 407, 456.1, 456.2, 456.6, 456.5, 455/457, 404.2, 456, 67.1, 67.11; 342/357.1, 342/357.12, 357.14, 457.1, 457, 387
See application file for complete search history.

(56) References Cited

U.S. PATENT DOCUMENTS 5,542,100 A * 7/1996 Hatakeyama ............ 455/404.2

(Continued)

FOREIGN PATENT DOCUMENTS

GB    2 322 248    8/1998

(Continued)

OTHER PUBLICATIONS

3GPP TSG Sevices and System Aspects: "3G TS 23.171 v.1.0.0 Functional stage 2 description of location services in UMTS", ESTI 3GPP TS 23.171 V1.0.0, Oct. 1999.

(Continued)

*Primary Examiner*—William D. Cumming
(74) *Attorney, Agent, or Firm*—Brinks Hofer Gilson & Lione

(57) ABSTRACT

A positional information service server selects a measuring system most suitable for measuring quality conditions received from a terminal requesting measurement when able to measure position of a designated mobile unit to be measured by a plurality of measuring systems. The positional information service server acquires the positional information of the mobile unit based on the selected measuring system, and transmits it to the terminal designated as the one to be notified.

30 Claims, 26 Drawing Sheets

U.S. PATENT DOCUMENTS

| | | | |
|---|---|---|---|
| 5,768,640 A | 6/1998 | Takahashi et al. | |
| 6,191,737 B1 * | 2/2001 | Havinis et al. | 342/450 |
| 6,236,365 B1 * | 5/2001 | LeBlanc et al. | 342/457 |
| 6,282,427 B1 * | 8/2001 | Larsson et al. | 455/456.2 |
| 6,321,092 B1 * | 11/2001 | Fitch et al. | 455/456.5 |
| 6,347,227 B1 * | 2/2002 | Johansson | 455/456.1 |
| 6,522,888 B1 * | 2/2003 | Garceran et al. | 455/456.3 |
| 6,756,941 B2 * | 6/2004 | Martikkala | 342/387 |
| 6,941,110 B2 * | 9/2005 | Kloper et al. | 455/67.11 |
| 2001/0044310 A1 * | 11/2001 | Lincke | 455/456 |

FOREIGN PATENT DOCUMENTS

| | | |
|---|---|---|
| JP | 09-127594 | 5/1997 |
| JP | 10-170625 | 6/1998 |
| JP | 10-213644 | 8/1998 |
| JP | 10-281801 | 10/1998 |
| JP | 2001-318134 | 11/2001 |
| KR | 1998-31026 | 7/1998 |
| KR | 2000-06760 | 2/2000 |

OTHER PUBLICATIONS

3GPP "3G TS 25.305 version 3.2.0 Stage 2 Functional specification of Location services in UTRAN" ESTI TS 125 305 V3.2.0, Jun. 2000.

3GPP TSG RAN "3G TR25.923 v1.1.0 Report on Location Services (LCS)" 3G TR 24.923 V1.1.0, Aug. 1999.

* cited by examiner

| TELEPHONE NUMBER | BASE STATION ID | ACQUISITION DATE AND TIME INFORMATION |
|---|---|---|
| 0901-111-1111 | BS00001 | 09081513 |
| 0901-111-1112 | BS00011 | 09081458 |
| 0901-111-1113 | BS00050 | 09081041 |
| ... | ... | ... |
| ... | ... | ... |
| ... | ... | ... |

| TELEPHONE NUMBER | AREA ID | ACQUISITION DATE AND TIME INFORMATION |
|---|---|---|
| 0902-222-1111 | AR10001 | 09081216 |
| 0902-222-1112 | AR10011 | 09081048 |
| 0902-222-1113 | AR20050 | 09081223 |
| ... | ... | ... |
| ... | ... | ... |
| ... | ... | ... |

| TELEPHONE NUMBER | SECTOR ID | ACQUISITION DATE AND TIME INFORMATION |
|---|---|---|
| 0903-333-1111 | ST70007 | 09081628 |
| 0903-333-1112 | ST60041 | 09081517 |
| 0903-333-1113 | ST40056 | 09081248 |
| 0903-333-1114 |  | 09081423 |
| ... | ... | ... |
| ... | ... | ... |

| SUBSCRIBER ID | MOBILE UNIT, TERMINAL, IP SERVER | | |
|---|---|---|---|
| | TELEPHONE NUMBER | E-MAIL ADDRESS | IP ADDRESS (IPv4 OR IPv6) |
| PS074699510 | 0901-111-1111 | — | ××××× |
| PS018679909 | 0901-111-1112 | ○○@×××.co.jp | △△△△△ |
| PS064759881 | 0901-111-1113 | □□□@○○.co.jp | — |
| ⋮ | ⋮ | ⋮ | ⋮ |

FIG. 9

| SUBSCRIBER ID | BASE STATION ID SYSTEM | AREA ID SYSTEM | SECTOR ID SYSTEM | GPS SYSTEM | | |
|---|---|---|---|---|---|---|
| | | | | A SYSTEM | B SYSTEM | C SYSTEM |
| PS07469510 | 1 | 0 | 0 | 1 | 0 | 0 |
| PS01867909 | 0 | 0 | 1 | 0 | 1 | 1 |
| PS06475881 | 1 | 1 | 0 | 0 | 0 | 0 |
| ⋮ | ⋮ | ⋮ | ⋮ | ⋮ | ⋮ | ⋮ |

454

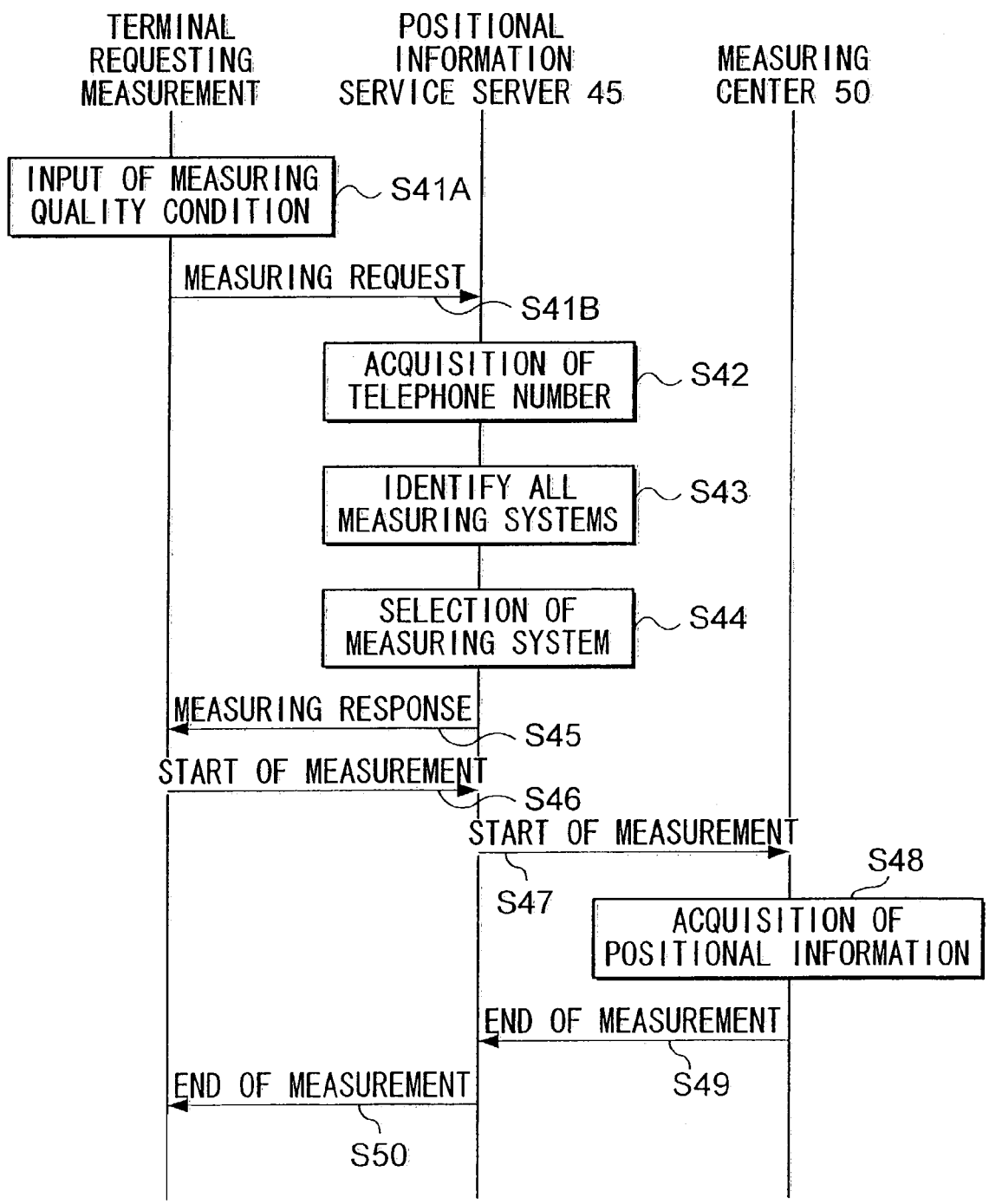

FIG. 15

INPUT MEASURING QUALITY CONDITIONS

- MEASURING
  TIME
  : ☐ NO DESIGNATION (LATEST ONE ACQUIRED BY MEASURING CENTER)
  ■ WITHIN 30 MINUTES OR WITHIN __ HOURS
  ☐ CURRENT

- MEASURING
  PRECISION
  : ■ HIGH PRECISION
  ☐ MEDIUM PRECISION
  ☐ LOW PRECISION

- RATE
  : ■ NO DESIGNATION (HIGH OK)
  ☐ AS LOW AS POSSIBLE

- ALLOWABLE
  WAITING TIME : ■ NO DESIGNATION
  ☐ WITHIN __ MINUTES

- PRIORITY
  ORDER
  : MEASURING TIME         #2
    MEASURING PRECISION    #1
    RATE                   #3
    ALLOWABLE WAITING TIME #4

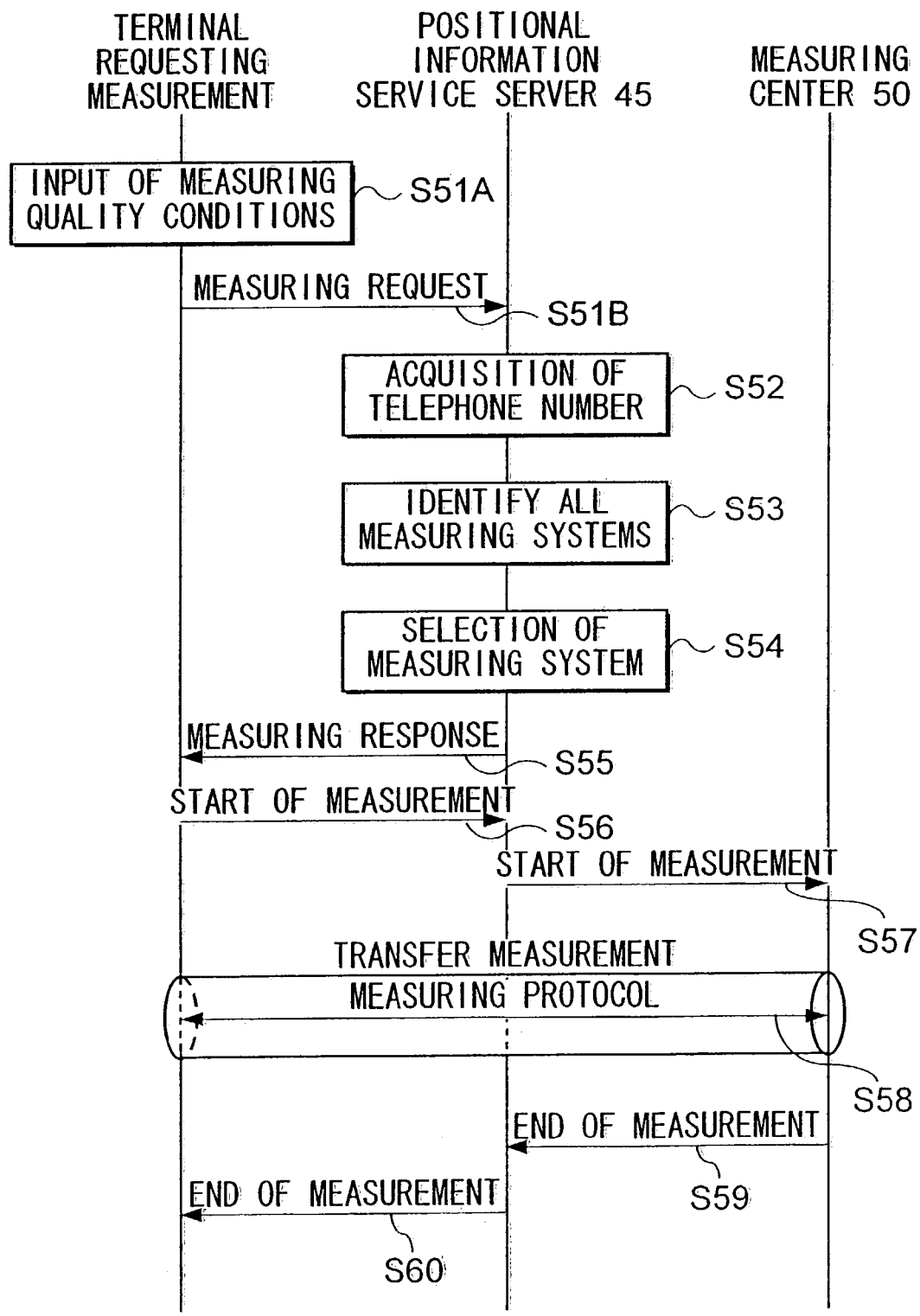

FIG. 22

| MEASURING CENTER ID | OPERATION FLAG |
|---|---|
| LC001 | 1 |
| LC002 | 0 |
| LC003 | 1 |
| . . . | . . . |
| . . . | . . . |

| SUBSCRIBER ID | MOBILE UNIT, TERMINAL, IP SERVER | | | COMMUNICATION ADDRESS OF MEASURING CENTER |
|---|---|---|---|---|
| | TELEPHONE NUMBER | E-MAIL ADDRESS | IP ADDRESS (IPv4 OR IPv6) | |
| PS074469510 | 0901-111-1111 | — | ×××××× | □□□□□□ |
| PS01867909 | 0901-111-1112 | ○○@×××.co.jp | △△△△△△ | □□□□□□ |
| PS064758881 | 0901-111-1113 | □□□@○○.co.jp | — | □□□□□□ |
| AS03294413 | 0901-147-1398 | — | — | 03-1234-5678 |
| AS03243691 | 0901-145-1960 | — | — | 03-1234-5678 |
| ⋮ | ⋮ | ⋮ | ⋮ | ⋮ |

600

POSITIONAL INFORMATION PROVIDING APPARATUS COMMUNICATION TERMINAL MOBILE COMMUNICATION TERMINAL AND POSITIONAL INFORMATION PROVIDING METHOD

TECHNICAL FIELD

The present invention relates to a positional information providing apparatus for providing positional information of a mobile communication terminal, a communication terminal, a mobile communication terminal, and a positional information providing method.

BACKGROUND ART

Positional information providing services providing various terminals with positional information of a PHS (Personal Handyphone System) terminal, mobile phone, or other mobile unit through a communications network are being commercially offered. The positional information providing systems providing these services are connected to mobile communication networks or the Internet etc., acquire positional information of a mobile unit in response to a request from the terminal, and transmit the information to the terminal to be notified.

For example, in a mobile communications network, the ID of the wireless zone in which the mobile unit is located, or the ID of the exchange unit having jurisdiction over the wireless zone is registered in a service control office for each mobile unit stored in the mobile communications network for a packet communication and the like. Current position searching services and position tracking services using these wireless zone IDs and exchange IDs as positional information of the mobile units have already been established.

Further, some of these positional information providing services can provide service users with high precision positional information of the mobile units measured by using GPS (Global Measuring System) receivers when these GPS receivers are built into the mobile units.

Here, when a positional information providing system acquires positional information of a mobile unit with a built-in GPS receiver, the positional information providing system can acquire the positional information of the mobile unit by a total of two types of systems, which are, the system of acquiring the wireless zone ID of the mobile unit or the exchange ID from the service control office of the mobile communications network, and the system of acquiring the positional information of the mobile unit by using the GPS receiver. The mobile units which are able to measure position by using a plurality of measuring systems have been marketed in recent years. Along with the spread of these mobile units, positional information providing systems have been augmented in function so as to be able to provide positional information on mobile units by various measuring systems.

Service users receiving the positional information of a mobile unit by using such a positional information providing service, however, place various demands on the positional information supplied. For example, they want the current positional information, not the one more than 30 minutes ago, want positional information of as high a precision as possible, want to acquire positional information at as low a rate as possible even at the expense of a lower precision, want to acquire positional information in as short a time as possible, etc.

DISCLOSURE OF INVENTION

An object of the present invention is to provide a positional information providing system, a communication terminal, a mobile communication terminal, and a positional information providing method able to use the optimal measuring system in accordance with the desires of a service user so as to acquire positional information of a mobile communication terminal and to transmit it to a terminal to be notified when able to acquire the positional information of the mobile communication terminal by using a plurality of measuring systems.

To achieve this object, the present invention provides a positional information providing apparatus comprising a receiving means for receiving, from a terminal requesting measurement, identification information identifying a mobile communication terminal to be measured, and measuring quality conditions indicating conditions regarding the quality of the measurement, a selecting means for selecting a measuring system suitable for the received measuring quality conditions from among a plurality of measuring systems able to measure the position of the mobile communication terminal identified by the received identification information, an acquiring means for acquiring the positional information of the mobile communication terminal based on the measuring system selected by the selecting means, and a transmitting means for transmitting positional information acquired by the acquiring means to a designated terminal to be notified.

Further, the present invention provides a positional information providing method comprising a receiving step in which a positional information providing apparatus receives from a terminal requesting measurement, identification information identifying a mobile communication terminal to be measured, and measuring quality conditions indicating conditions regarding the quality of the measurement, a selecting step in which the positional information providing apparatus selects a measuring system suitable for the measuring quality conditions received at the receiving step from among a plurality of measuring systems able to measure the position of the mobile communication terminal identified by the identification information received at the receiving step, an acquiring step in which the positional information providing apparatus acquires the positional information of the mobile communication terminal based on the measuring system selected by the selecting step, and a transmitting step in which the positional information providing apparatus transmits positional information acquired by the acquiring step to a designated terminal to be notified.

According to the present invention, the positional information providing apparatus selects the measuring system most suitable for measuring quality conditions received from a terminal requesting measurement when able to measure a position of a mobile communication terminal to be measured by a plurality of measuring systems, acquires the positional information of the mobile communication terminal based on the measuring system, and transmits it to the terminal to be notified.

Further, the present invention provides a positional information providing apparatus comprising a receiving means for receiving, from a terminal requesting measurement, identification information identifying a mobile communication terminal to be measured and measuring quality conditions indicating conditions regarding the quality of the measurement, a setting means for setting a priority order using measuring systems based on the received measuring quality conditions for a plurality of measuring systems able to measure the position of the mobile communication terminal identified by the received identification information, an acquiring means for acquiring the positional information of the mobile communication terminal based on a measuring system in order from the measuring system with the highest priority order set by the setting means and, when the positional information cannot be acquired, acquiring the positional information of the mobile communication terminal based on the measuring system with the next highest priority order, and a transmitting means for transmitting positional information acquired by the acquiring means, to a terminal designated to be notified.

Further, the present invention provides a positional information providing method comprising a receiving step in which a positional information providing apparatus receives, from a terminal requesting measurement, identification information identifying a mobile communication terminal to be measured and measuring quality conditions indicating conditions regarding the quality of the measurement, a setting step in which the positional information providing apparatus sets a priority order using measuring systems based on the measuring quality conditions received at the receiving step for a plurality of measuring systems able to measure the position of the mobile communication terminal identified by the received identification information, an acquiring step in which the positional information providing apparatus acquires the positional information of the mobile communication terminal based on a measuring system in order from the measuring system with the highest priority order set by the setting step and, when the positional information cannot be acquired, acquiring the positional information of the mobile communication terminal based on the measuring system with the next highest priority order, and a transmitting step in which the positional information providing apparatus transmits positional information acquired by the acquiring step to a terminal designated to be notified.

According to the present invention, the positional information providing apparatus sets the priority order using measuring systems based on the measuring quality conditions received from a terminal requesting measurement when able to measure a position of a mobile communication terminal to be measured by a plurality of measuring systems, decides on the measuring system in accordance with the priority order, acquires the positional information of the mobile communication terminal, and transmits it to the terminal to be notified.

Further, the present invention provides a communication terminal for requesting the provision of positional information to a positional information providing apparatus providing positional information acquired by measuring the position of a mobile communication terminal, the communication terminal comprises an input means for inputting identification information identifying a mobile communication terminal to be acquired by positional information, and measuring quality conditions indicating conditions relating to the quality of the measurement of positional information to which the positional information providing apparatus refers for selecting a measuring system to be used from among a plurality of measuring systems able to measure the position of the mobile communication terminal, and a transmitting means for transmitting the identification information and measuring quality conditions input by the input means to the positional information providing apparatus.

According to the present invention, when the communication terminal requests provision of positional information of a mobile communication terminal to the positional information providing apparatus, it transmits to the positional information providing apparatus, measuring quality conditions to which the positional information providing apparatus refers in order to select the measuring system to use from among a plurality of measuring systems able to measure a position of the mobile communication terminal to be acquired by the positional information, and identification information of the mobile communication terminal to be acquired by the positional information.

Further, the present invention provides a mobile communication terminal for requesting provision of positional information of the mobile communication terminal to a positional information providing apparatus providing positional information acquired by measuring the position of the mobile communication terminal, the mobile communication terminal comprises an input means for inputting measuring quality conditions indicating conditions relating to the quality of the measurement of positional information of the mobile communication terminal requesting provision to the positional information providing apparatus, a selecting means for selecting a measuring system suitable for the measuring quality conditions input by the input means from among a plurality of measuring systems able to measure the position of mobile communication terminal, and a transmitting means for transmitting the measuring system selected by the selecting means, and identification information identifying the mobile communication terminal to the positional information providing apparatus.

According to the present invention, when requesting the provision of positional information of the mobile communication terminal to a positional information providing apparatus, a mobile communication terminal selects the measuring system most suitable for the measuring quality conditions input from among the plurality of measuring systems able to measure the position of the mobile communication terminal, and transmits the measuring system and identification information of the mobile communication terminal to the positional information providing apparatus.

Further, the present invention provides a mobile communication terminal for requesting the provision of positional information of the mobile communication terminal to a positional information providing apparatus providing positional information acquired by measuring the position of the mobile communication terminal, the mobile communication terminal comprises an input means for inputting measuring quality conditions indicating conditions relating to the quality of measurement of the positional information of the mobile communication terminal requesting provision to the positional information providing apparatus, a setting means for setting a priority order using measuring systems based on the measuring quality conditions input by the input means for a plurality of measuring systems able to measure the position of the mobile communication terminal, and a transmitting means for transmitting the priority order of the measuring systems set by the setting means, and identification information identifying the mobile communication terminal to the positional information providing apparatus.

According to the present invention, when requesting provision of positional information of the mobile communication terminal from a positional information providing apparatus, the mobile communication terminal sets a priority order for which the positional information providing apparatus uses the measuring systems, for measuring systems able to measure the position of the mobile communication terminal, and transmits the priority order of the measuring systems and identification information of the mobile communication terminal to the positional information providing apparatus.

BRIEF DESCRIPTION OF DRAWINGS

FIG. 2 is a diagram illustrating the data configuration of a base station ID table stored in a measuring center according to the present embodiment.

FIG. 3 is a diagram illustrating the data configuration of an area ID table stored in a measuring center according to the present embodiment.

FIG. 4 is a diagram illustrating the data configuration of a sector ID table stored in a measuring center according to the present embodiment.

FIG. 8 is a diagram illustrating the data configuration of a subscriber information database stored in the positional information service server according to the present embodiment.

FIG. 9 is a diagram illustrating the data configuration of a measuring system database stored in the positional information service server according to the present embodiment.

FIG. 14 is a sequence chart explaining the operation of devices when executing a measuring function (quasi-measuring system) of the positional information service according to the present embodiment.

FIG. 15 is a diagram illustrating an input screen of measuring quality conditions in a service terminal according to the present embodiment.

FIG. 16 is a sequence chart explaining the operation of devices when executing a measuring function (actual measuring system) of the positional information service according to the present embodiment.

FIG. 22 is a diagram illustrating the data configuration of a measuring center table stored in the positional information service server according to a first modification of the present invention.

FIG. 29 is a diagram illustrating the data configuration of a subscriber information database stored in the positional information service server according to the fourth embodiment.

BEST MODE FOR CARRYING OUT THE INVENTION

Next, an embodiment of the present invention will be explained. This embodiment shows one aspect of the present invention and does not limit the invention. It can be changed in any way within the scope of the present invention.

<A-1. Configuration of Embodiment>

<1. Overall Configuration of Communication System>

Figure 1:
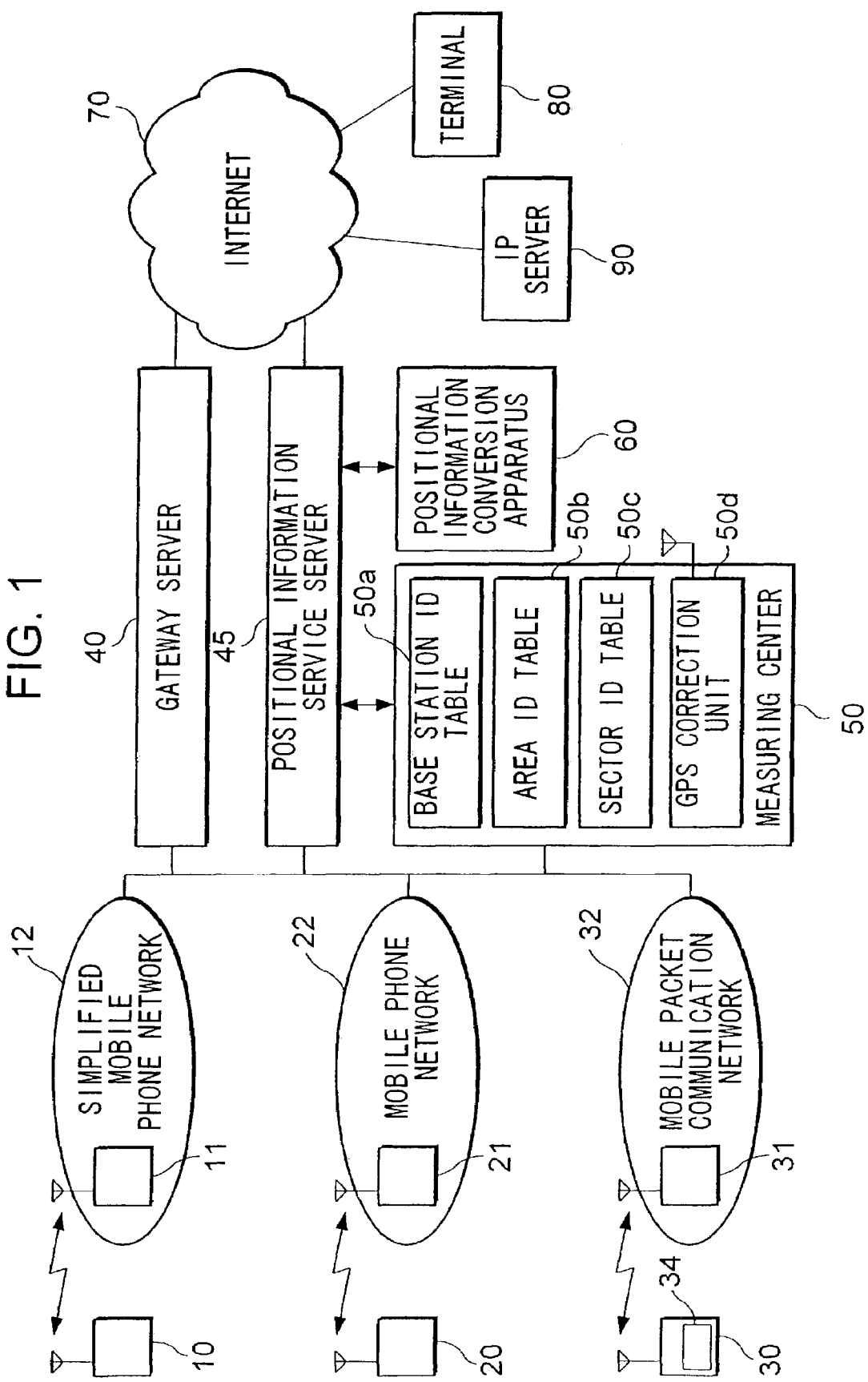
FIG. 1 is a diagram illustrating the overall configuration of a communications system according to an embodiment of the present invention.

FIG. 1 is a diagram illustrating the overall configuration of a communication system according to the present embodiment. In the figure, a simplified mobile phone 10 is a mobile unit provided in a simplified mobile phone network 12, such as a PHS. This simplified mobile phone 10 can communicate wirelessly with a base station 11 of the simplified mobile phone network 12 to receive a PHS communication service. Mobile phone 20 is (Personal Digital Cellular) a mobile unit provided in a mobile phone network 22, such as PDC. Mobile phone 20 can communicate wirelessly with a base station 21 of mobile phone network 22 to receive a PC communication service.

A mobile phone 30 is a mobile unit provided in a mobile packet communication network 32. This mobile phone 30 can communicate wirelessly with a base station 31 of a mobile packet communication network 32 to receive a packet communication service. Further, mobile phone 30 has a built-in GPS receiver 34. This GPS receiver 34 may be used by mobile phone 30 to acquire high precision positional information comprised of a longitude, latitude, and altitude or high precision current time information. Note that mobile phone 30 may also be of a type which does not have a built-in GPS receiver 34, but can be connected to a GPS receiver 34.

A gateway server 40 is provided between simplified mobile phone network 12, mobile phone network 22, mobile packet communication network 32, or other mobile communication network and the Internet 70; and relays the transfer of data between networks having different communication protocols. Explaining this more specifically, for example, gateway server 40 converts between the communication protocol for mobile packet communication network 32 and a standard communication protocol of the Internet 70, that is, the TCP/IP (Transmission Control Protocol/Internet Protocol) or UDP/IP (User Data Protocol/Internet Protocol) to relay the transfer of data between mobile packet communication network 32 and Internet 70. Note that when mobile units 10, 20, and 30 use the TCP/IP, gateway server 40 only converts protocol at a layer lower than the TCP/IP.

A positional information service server 45 provides a positional information service to terminal 80, such as PC, connected to the Internet 70, or IP (Information Provider) server 90, mobile unit 10, 20, or 30, etc. This positional information service server 45 is provided as a separate apparatus from gateway server 40. This is so as to disperse the load relating to the positional information service, which has been increasing along with the greater sophistication in functions of positional information services and the increase in the service users, from gateway server 40 and thereby lighten the load on gateway server 40. Note that in this specification, mobile units 10, 20, and 30, terminal 80, IP server 90, and other communication terminals able to receive the provision of the positional information service from positional information service server 45 will be referred to as "service terminals".

A measuring center 50 has the function of acquiring and storing the positional information of mobile units 10, 20, and 30. Here, the positional information of mobile units 10, 20, and 30 stored in measuring center 50 will be explained. Firstly, in simplified mobile phone network 12, a base station ID, for identifying the wireless zone of base station 11 in which the simplified mobile phone 10 is currently located for each simplified mobile phone 10, is registered with a service control station (not shown here).

Measuring center 50, for example, accesses the service control station of simplified mobile phone network 12 periodically to acquire the base station IDs of each simplified mobile phone 10. Further, measuring center 50, as shown in FIG. 2, stores the telephone number of each simplified mobile phone 10, the base station ID acquired, and acquisition date and time information on the base station ID acquired from simplified mobile phone network 12 in base station ID table 50a linked together. Note that in base station ID table 50a shown in FIG. 2, the first four digits of the acquisition date and time information show the month and day, and the last four digits the time.

Further, in mobile phone network 22, an area ID, for identifying the service area in which the mobile phone 20 is currently located for every mobile phone 20, is registered with the service control station (not shown here). Here, the "service area" is an area comprised of the wireless zones of a plurality of base stations 21. Measuring center 50 for example accesses the service control station of mobile phone network 22 periodically to acquire the area IDs of the mobile phones 20. Further, measuring center 50, as shown in FIG. 3, stores the telephone number of each mobile phone 20, the area ID acquired, and acquisition date and time information on the area ID acquired from mobile phone network 12 in area ID table 50b linked together.

Further, in mobile packet communication network 32, a sector ID, for identifying the sector of the wireless zone in which mobile phone 30 is currently located for every mobile phone 30, is registered with the service control station (not shown here). Here, the "sector" is a partial area of a wireless zones divided by a directional antenna of base station 31. Measuring center 50 for example accesses the service control station of mobile phone network 32 periodically to acquire the sector IDs of mobile phones 30. Further, measuring center 50, as shown in FIG. 4, stores the telephone number of each mobile phone 30, the sector ID acquired, and acquisition date and time information on the sector ID acquired from the mobile packet communication network 32 in sector ID table 50c linked together. Note that when the power of mobile phone 30 is not on or mobile phone 30 is located outside of the service area, as shown in FIG. 4, the symbol "-" indicating that mobile phone 30 is not located in any sector is stored in the "sector ID" field.

Further, measuring center 50 has a GPS correction unit 50d. This GPS correction unit 50d corrects the GPS measured value of a mobile phone 30 measured by the D (Differential)-GPS system based on the GPS measurement error value held by measuring center 50 itself. Further, GPS correction unit 50d stores the positional information of mobile phone 30 measured in a longitude and latitude table (not shown here) in GPS correction unit 50d linked with the telephone number of mobile phone 30 etc.

Note that measuring center 50 may also be configured to store the positional information of mobile units 10, 20, and 30 for a predetermined period as log information. In this case, measuring center 50 can also store not just the single latest positional information for each mobile unit 10, 20, and 30, but a plurality of positional information.

Note that the positional information of mobile units 10, 20, and 30 stored in measuring center 50 are of various data formats as described above, such as the base station ID format, area ID format, sector ID format, and GPS format. Further, a service terminal may also have a data format of positional information using the same. For example, there are some service terminals desiring to use positional information in a data format comprised of the longitude, latitude, and altitude, while there are other service terminals desiring to use the positional information in the base station ID format. Further, there are service terminals desiring to use positional information of a data format of the name of the city, village, town, or other administrative division.

To make up for these differences in data formats and maintain compatibility of the positional information, a positional information conversion apparatus 60 is provided. This positional information conversion apparatus 60 is provided with various conversion tables for converting the data format of positional information to another data format; and can convert the data format of positional information to a data format which can be handled by different service terminals or a data format desired to be used by different service terminals.

IP server 90 provides content relating to the positional information provided from positional information service server 45, to terminal 80 or mobile units 10, 20, and 30. Further, terminal 80 or IP server 90 can access positional information service server 45 directly through the Internet 70.

<2. Configuration of Mobile Unit>

Figure 5:
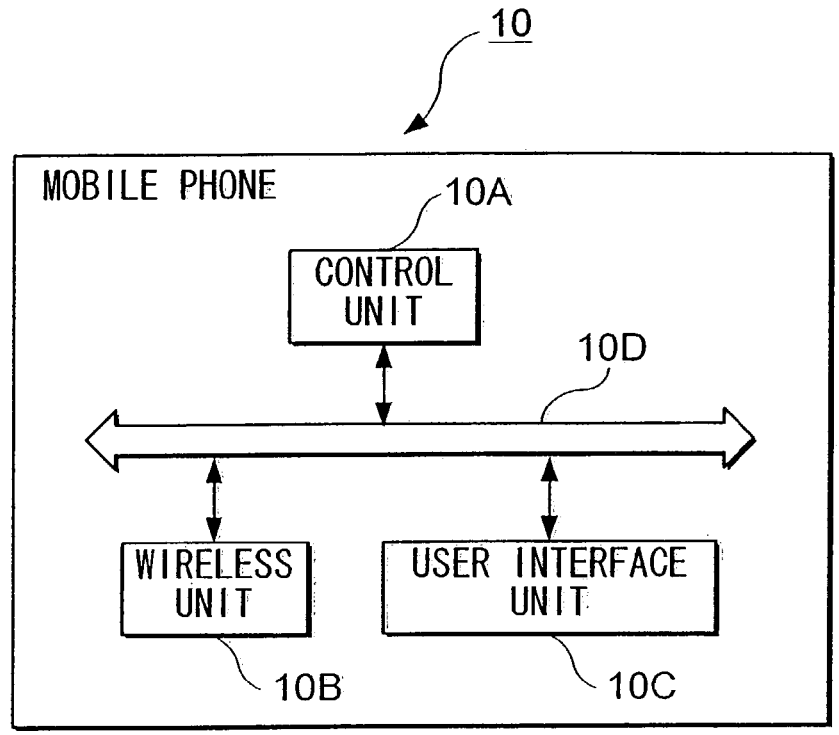
FIG. 5 is a block diagram illustrating the configuration of a simplified mobile phone according to the present embodiment.

FIG. 5 is a block diagram illustrating the configuration of a simplified mobile phone 10. In the figure, simplified mobile phone 10 has a control unit 10A, a wireless unit 10B, and a user interface unit 10C. These units are connected with each other through a bus 10D. Control unit 10A is provided with a CPU, memory, etc., and controls the units of simplified mobile phone 10. Wireless unit 10B controls wireless communications executed with base station 11. User interface unit 10C is comprised of a microphone, speaker, and audio processing unit for speaking, a control panel for inputting numbers, letters, operating instructions, etc., and a liquid crystal display unit, etc. Note that the configuration of mobile phone 20 is substantially the same as the configuration of simplified mobile phone 10 illustrated in FIG. 5, so the explanation will be omitted.

Figure 6:
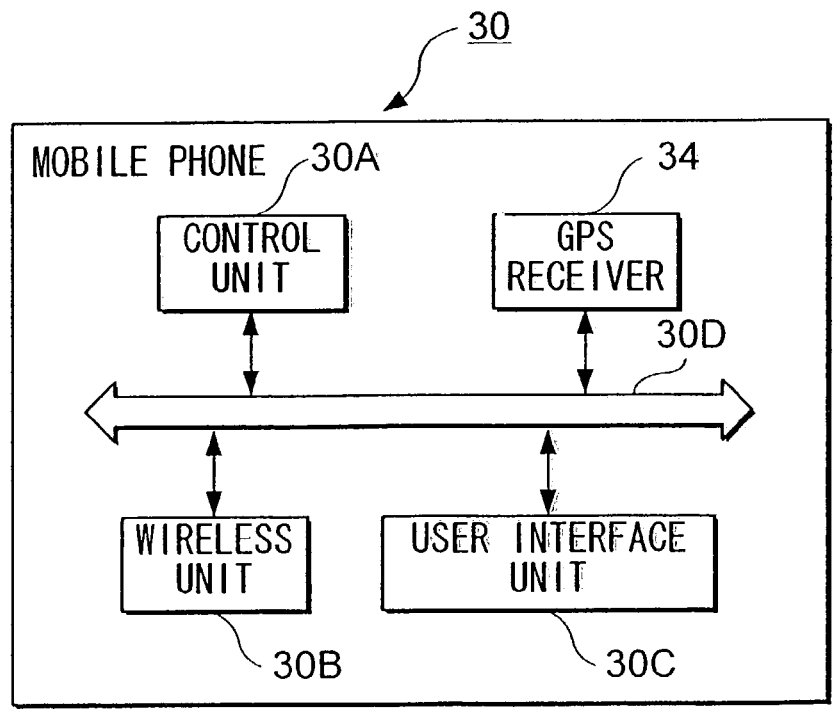
FIG. 6 is a block diagram illustrating the configuration of a mobile phone according to the present embodiment.

Next, FIG. 6 is a block diagram illustrating the configuration of a mobile phone 30. In the figure, mobile phone 30 has a control unit 30A, a wireless unit 30B, a user interface unit 30C, and a GPS receiver 34. The parts are connected with each other through a bus 30D. Mobile phone 30 differs from mobile phone 20 in the point that packet communication is possible and the point that a GPS receiver 34 is built in. GPS receiver 34 receives signals from a plurality of GPS satellites to measure the current position of the mobile phone 30 or the current time etc. These measurement values are transmitted from wireless unit 30B, through base station 31 and mobile packet communications network 32, to measuring center 50 where GPS correction unit 50d executes D-GPS correction. Further, mobile phone 30 has application software or a browser function for receiving a positional information service.

<3. Configuration of Positional Information Service Server>

Figure 7:
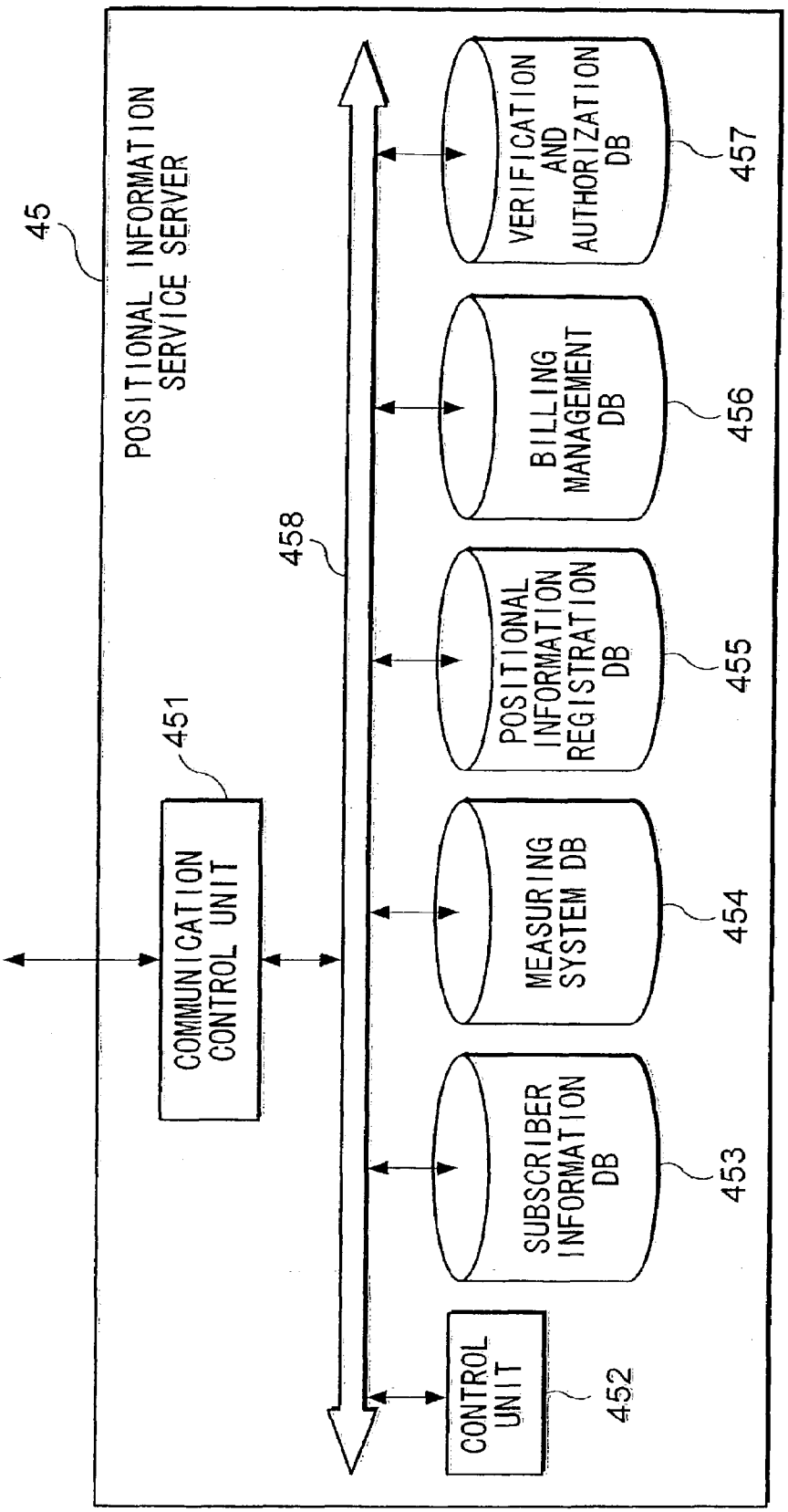
FIG. 7 is a block diagram illustrating the configuration of a positional information service server according to the present embodiment.

FIG. 7 is a block diagram illustrating the configuration of positional information service server 45. In the figure, positional information service server 45 has a communication control unit 451, a control unit 452, a subscriber information database 453, a measuring system database 454, a positional information registration database 455, a billing management database 456, and a verification and authorization database 457. These units are connected to each other through a bus 458.

Communication control unit 451 controls the data communication between the service terminals and measuring center 50 and positional information conversion apparatus 60. Control unit 452 is provided with a CPU, memory, etc. and controls the units of the positional information service server 45. Subscriber information database 453 is a database in which the subscriber information of the positional information service is stored. As shown in FIG. 8, subscriber information database 453 stores the "telephone number" of the service terminal owned by a subscriber, "e-mail address", and "IP address" for each "subscriber ID" assigned to subscribers of the positional information service. Note that as an IP address, it is possible for example to use an IP address of an IPv4 (Internet Protocol version 4) format or IPv6 format.

Subscriber information database 453 is referred for identifying the service terminal requesting measurement or to be notified, or mobile unit 10, 20, or 30 to be measured. For example, control unit 452 can identify mobile unit 10, 20, or 30 to be measured by the "telephone number" or "e-mail address". Note that subscriber information database 453 shown in FIG. 8 can also be configured to further store personal information (name, address, date of birth, gender, age, etc.) linked with the "subscriber ID".

Next, FIG. 9 is a diagram illustrating the data configuration of the measuring system database 454. As shown in the figure, measuring system database 454 stores all measuring systems able to measure the position of a mobile unit 10, 20, or 30 owned by a subscriber for each "subscriber ID". In the illustrated example, it is provided with the fields "base station ID system", "area ID system", "sector ID system", "A system (GPS)", "B system (GPS)", and "C system (GPS)" for each "subscriber ID". "1" is stored in the fields of the measuring systems which can measure position for each mobile unit 10, 20, or 30, and "0" in the fields of the measuring systems which cannot measure position. Measuring system database 454 is prepared based on the model information of mobile units 10, 20, and 30 owned which are reported from the subscribers when subscribing to the positional information service.

Further, positional information registration database 455 stores positional information registered and indicated by the service terminals and associated information. Here, "associated information" is for example the measuring system or acquisition date and time information of the positional information, information identifying the mobile units 10, 20, and 30 to be measured, a comment showing the state of the mobile units 10, 20, and 30 at the time of measuring (for example, "moving" or "stopped"), and etc. By providing this positional information registration database 455 in positional information service server 45, a service terminal need not store the positional information or associated information inside the service terminal, but can refer to the positional information or associated information which was registered there in advance by accessing positional information registration database 455. Further, if the mobile unit is configured to store its own current positional information and associated information in positional information registration database 455 at predetermined time intervals, a third party can refer to the information without measuring.

Billing management database 456 stores billing information of the subscribers generated along with use of the positional information service. Control unit 452 calculates the amount of billing for each subscriber in accordance with the amount of access to positional information service server 45 or the measuring system used for acquisition of the positional information, and stores it in billing management database 456. Here, the amount of access to positional information service server 45 is calculated based on for example the access time or the number of accesses. Further, for acquisition of the positional information, for example, a rate for each use is set for each measuring system. The amount of billing is calculated in accordance with the type of the measuring system used, the number of acquisitions, etc.

Verification and authorization database 457 stores verification information for determining the correctness of the subscriber or authorization information indicating the content of the service allowed for the subscriber for each subscriber. Positional information service server 45 verifies the user by referring to subscriber information database 453 or verification and authorization database 457 when receiving a request for access from a service terminal. Further, positional information service server 45 determines whether the service request is a service in the range allowed for the subscriber by referring to verification and authorization database 457 when receiving a service request from a service terminal.

Note that in the following explanation of the operation, to avoid complicating the explanation, the descriptions of the user verification or authorization and charging are omitted. Further, for communication between positional information service server 45 and service terminals, it is possible to apply a SSL (Security Socket Layer) etc. for ensuring security.

<A-2. Operation of Embodiment>

Next, the operation of the embodiment will be explained.

<1. Basic Functions Provided by Positional Information Service>

The basic functions of the positional information service provided by positional information service server 45 may be roughly divided into a total of six functions, which are, a registration function, reference function, conversion function, notification function, measuring function, and search function.

<1-1. Registration Function>

Figure 10:
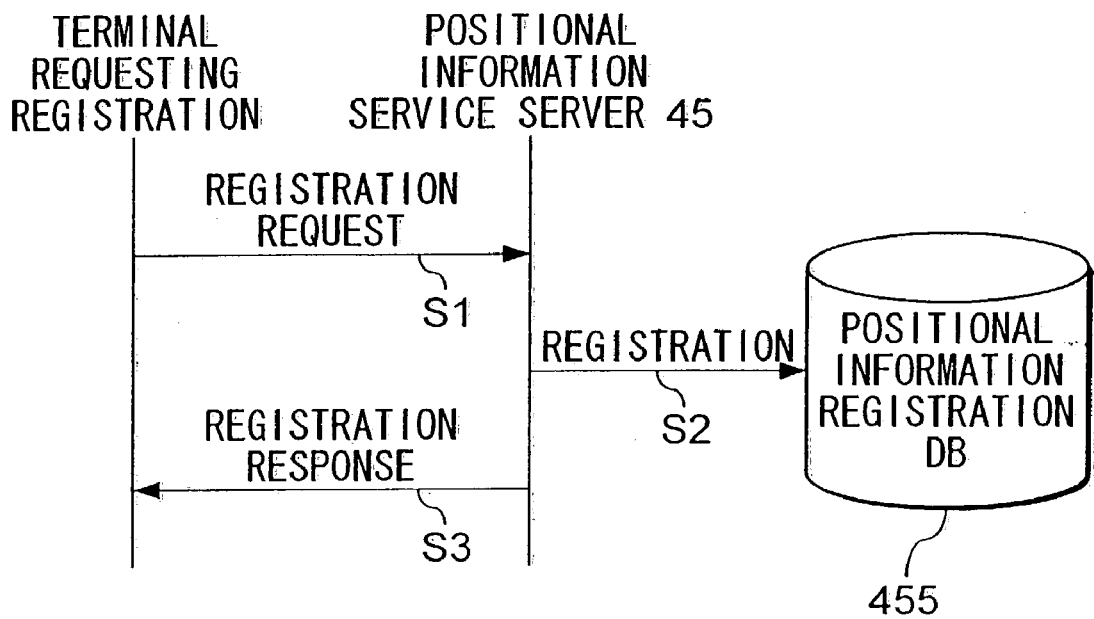
FIG. 10 is a sequence chart explaining the operation of devices when executing a registration function of the positional information service according to the present embodiment.

The registration function is a function of registering positional information etc. in positional information registration database 455 in positional information service server 45. A sequence chart for the case of execution of this registration function is shown in FIG. 10. Note that in this figure, the "terminal requesting registration" is specifically a mobile unit 10, 20, or 30, terminal 80, or IP server 90.

As shown in the figure, firstly, the terminal requesting the registration transmits a registration request to positional information service server 45 (step S1). This registration request includes an instruction instructing registration, the subscriber ID of the unit requesting the registration, the positional information is to be registered, subscriber information identifying mobile unit 10, 20, or 30 for which the positional information has been measured, etc. When receiving the registration request, positional information service server 45 registers the positional information included in the registration request or the subscriber ID of mobile unit 10, 20, or 30 for which the positional information is measured etc. in positional information registration database 455 (step S2). Here, the positional information registered in positional information registration database 455 may have added to it (the positional information), the above-mentioned measuring system, or other associated information, such as acquisition date and time information. Further, after registration, positional information service server 45 transmits a registration response indicating that registration of the positional information has been completed to the terminal requesting the registration (step S3).

<1-2. Reference Function>

Figure 11:
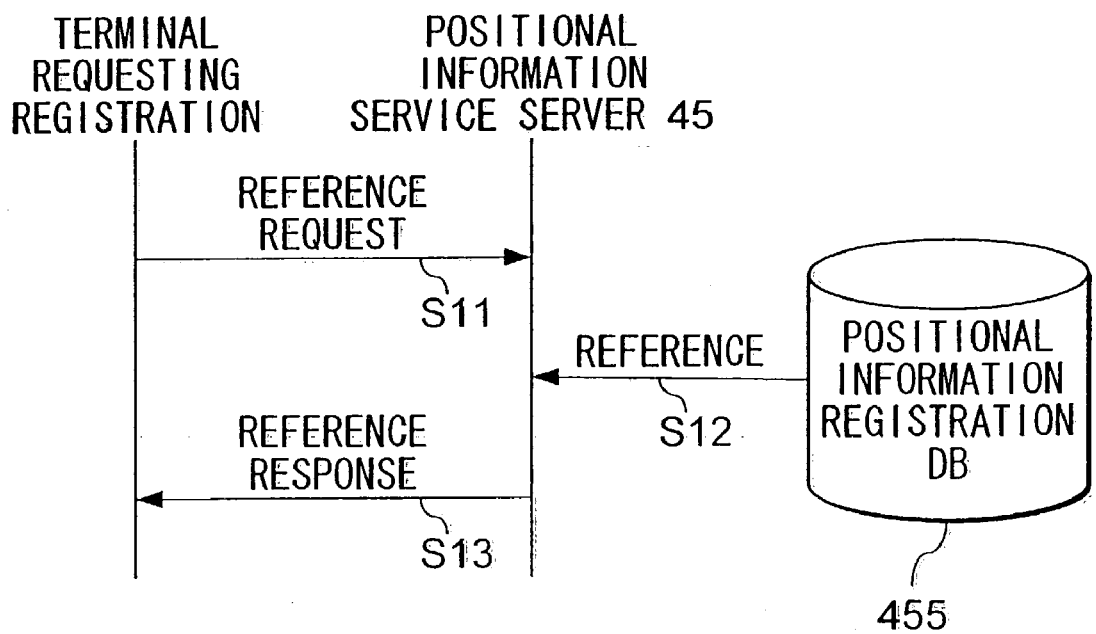
FIG. 11 is a sequence chart explaining the operation of devices when executing a reference function of the positional information service according to the present embodiment.

The reference function is a function of referring to the positional information etc. registered in positional information registration database 455. A sequence chart for the case of execution of this reference function is shown in FIG. 11. Note that the "terminal requesting reference" in this figure is specifically a mobile unit 10, 20, or 30, a terminal 80, or an IP server 90.

As shown in this figure, firstly, the terminal requesting reference transmits a reference request to positional information service server 45 (step S11). This reference request includes an instruction instructing reference, the subscriber ID of the unit requesting the reference, subscriber information identifying mobile unit 10, 20, or 30 to be referred to, a limiting condition, etc. Here, the "limiting condition" is for example information limiting the range of acquisition time of the positional information referred to, information limiting the measuring system, etc.

When receiving a reference request, positional information service server 45 first searches through subscriber information database 453, as a key that the subscriber information included in the reference request, and acquires the subscriber ID of mobile unit 10, 20, or 30 to be referred to. Next, positional information service server 45 searches through positional information registration database 455 in accordance with this subscriber ID and the limiting condition, and acquires the corresponding positional information (step S12). Next, positional information service server 45 transmits a reference response including the acquired positional information or associated information etc. back to the terminal requesting reference (step S13).

<1-3. Conversion Function>

Figure 12:
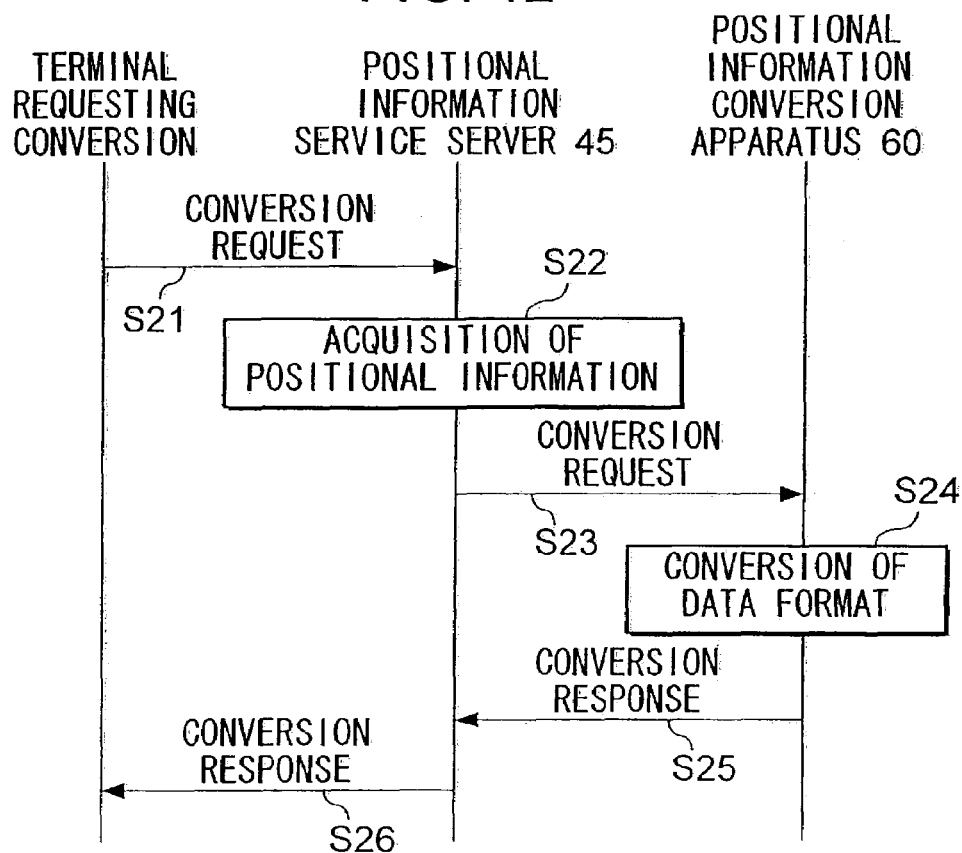
FIG. 12 is a sequence chart explaining the operation of devices when executing a conversion function of the positional information service according to the present embodiment.

The conversion function is a function of converting the data format of positional information. A sequence chart for the case of execution of this conversion function is shown in FIG. 12. Note that in this figure, the "terminal requesting conversion" is specifically a mobile unit 10, 20, or 30, a terminal 80, or an IP server 90.

As shown in this figure, firstly, the terminal requesting conversion transmits a conversion request to positional information service server 45 (step S21). This conversion request includes an instruction instructing conversion, the subscriber ID of the unit requesting conversion, information identifying the positional information to be converted, information designating the data formats before conversion and after conversion, etc.

When receiving a conversion request, positional information service server 45 acquires the positional information to be converted from positional information registration database 455 etc. in accordance with the information designating the positional information to be converted included in the conversion request (step S22). Next, positional information service server 45 transmits the conversion request to positional information conversion apparatus 60 (step S23).

This conversion request includes an instruction instructing conversion, the positional information to be converted acquired at the above step S22, information designating the data format before conversion and after conversion, etc.

When receiving the conversion request, positional information conversion apparatus 60 first determines the conversion table used for the conversion processing in accordance with the information designating the data format before conversion and after conversion included in the conversion request. Further, positional information conversion apparatus 60 converts the data format of the positional information using this conversion table (step S24). Next, positional information conversion apparatus 60 transmits the positional information of the converted data format to positional information service server 45 as a conversion response (step S25). When receiving the conversion response from positional information conversion apparatus 60, positional information service server 45 transmits the positional information included in the conversion response to the terminal requesting the conversion as the conversion response (step S26).

Note that at step S21, the conversion request transmitted from the terminal requesting conversion to positional information service server 45 may also include the positional information to be converted.

<1-4. Notification Function>

Figure 13:
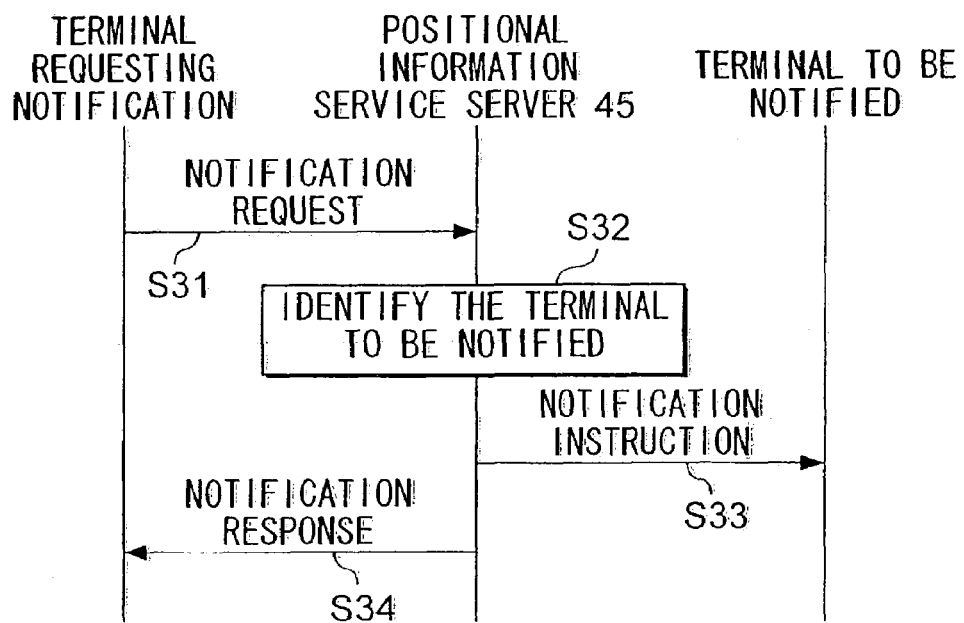
FIG. 13 is a sequence chart explaining the operation of devices when executing a notification function of the positional information service according to the present embodiment.

The notification function is a function for notifying the fact of registration of the positional information in positional information service server 45, or the positional information to the designated terminal to be notified. A sequence chart for the case of execution of this notification function is shown in FIG. 13. Note that in the figure, the "terminal requesting notification" and the "terminal to be notified" are specifically mobile units 10, 20, or 30, terminals 80, or IP servers 90.

As shown in the figure, first, the terminal requesting the notification transmits the notification request to positional information service server 45 (step S31). This notification request includes an instruction instructing notification, the subscriber ID of the unit requesting the notification, the subscriber information identifying the terminal to be notified, etc.

When receiving a notification request, positional information service server 45 searches through subscriber information database 453, as a key that the subscriber information identifying the terminal to be notified included in the notification request and identifies the terminal to be notified (step S32). Further, positional information service server 45 transmits a notification instruction indicating that the positional information acquired in response to a measuring request has been registered in positional information registration database 455 to the terminal to be notified (step S33). Next, positional information service server 45 transmits a notification response indicating that notification has been completed to the terminal requesting the notification (step S34).

Note that after step S32, positional information service server 45 may also acquire the corresponding positional information registered in the positional information registration database 455 or associated information, include the positional information or associated information in the notification instruction, then transmits the notification instruction to the terminal to be notified.

Further, notification instruction notified from positional information service server 45 to the terminal to be notified may also include just the associated information such as the registration time of the positional information except the positional information. In this case, at the terminal to be notified, the user identifies the positional information which the user desires to acquire from the registration time and other associated information included in the received notification instruction, and acquires the positional information from positional information service server 45 by using the reference function.

<1-5. Measuring Function>

The measuring function is a function for measuring the position of a mobile unit 10, 20, or 30 in accordance with a request from a terminal. This measuring function may be roughly divided into a quasi-measuring system for acquiring corresponding positional information from positional information of mobile units 10, 20, and 30 stored in measuring center 50, and an actual measuring system for actually measuring the position of a mobile unit 10, 20, or 30 in accordance with a measuring request.

<1-5-1. Quasi-Measuring System>

FIG. 14 is a sequence chart of the case of execution of a quasi-measuring system. Note that the sequence chart shown in this figure explains the case of the terminal requesting the measurement transmitting a measuring request for its own position to positional information service server 45, that is, the case where the terminal requesting measurement is a mobile unit 10, 20, or 30 to be measured.

As shown in the figure, firstly, mobile unit 10, 20, or 30 requesting the measurement executes processing for prompting the user to input the measuring quality conditions required to execute the requesting measurement (step S41A). Here, the "measuring quality conditions" are desires of the party requesting measurement (user) regarding the quality of the measurement of the positional information. The measuring quality conditions are comprised, for example, of information designating the range of time of measuring, information designating the precision of measuring, information designating a condition relating to the rate of billing accompanying measurement, information designating the allowable waiting time up to acquiring the measuring result, etc.

Users place various demands on the positional information to be acquired using the positional information service. For example, they want the current positional information, not any other, want positional information of as high a precision as possible, want to acquire positional information at as low a rate as possible even at the expense of a lower precision, want to acquire positional information in as short a time as possible, etc. Mobile unit 10, 20, or 30 requesting the measurement displays an input screen as illustrated in FIG. 15 in order to acquire the desires of the user with respect to the positional information. Further, the user inputs measuring quality conditions in accordance with this input screen. For example, in the example shown in FIG. 15, conditions of items such as the measuring time, measuring precision, rate, and allowable waiting time are set in accordance with control input, and the priority order of these conditions is set in accordance with control input.

Next, mobile unit 10, 20, or 30 requesting the measurement transmits the measuring request to positional information service server 45 (step S41B). This measuring request includes an instruction instructing measurement, the subscriber ID of the unit requesting the measurement (subscriber ID identifying mobile unit 10, 20, or 30 to be measured), the measuring quality conditions input at step S41A, etc.

When receiving a measuring request, positional information service server 45 searches through subscriber information database 453, as a key that the subscriber ID of mobile unit 10, 20, or 30 to be measured included in the measuring request, and acquires the telephone number of mobile unit 10, 20, or 30 to be measured (step S42). Next, positional information service server 45 refers to measuring system database 454, and identifies all of the measuring systems able to measure the position of mobile unit 10, 20, or 30 which to be measured (step S43).

Next, positional information service server 45 selects the measuring system most suitable for the measuring quality conditions received at step S41B from the identified measuring systems (step S44). When there is just one measuring system identified at step S43, however, that single identified measuring system is selected regardless of the content of the measuring quality conditions.

For example, in the measuring quality conditions illustrated in FIG. 15, it is learned that the user desires to acquire positional information of as high a precision as possible.

Consider the case where such measuring quality conditions are transmitted to positional information service server 45, the mobile unit to be measured is a mobile phone 30 with a built-in GPS receiver 34, and the position can be measured by the sector ID system and GPS system. In this case, positional information service server 45 selects the GPS system as the measuring system most suitable for the measuring quality conditions among the sector ID system and GPS system at step S44.

Next, positional information service server 45 transmits a measuring response including information relating to the measuring system selected at step S44 back to mobile unit 10, 20, or 30 requesting the measurement (step S45). Due to this, the user can confirm the measuring system used at mobile unit 10, 20, or 30 requesting the measurement. Next, mobile unit 10, 20, or 30 requesting the measurement transmits a measuring start instruction instructing the start of the measuring to positional information service server 45 (step S46). When receiving the measuring start instruction, the positional information service server 45 transmits a measuring start instruction including the telephone number of mobile unit 10, 20, or 30 to be measured identified at step S42 and the measuring system selected at step S44 etc., to measuring center 50 (step S47). Note that this sequence chart shows the quasi-measuring system. Therefore, when the measuring system selected at step S44 is the actual measuring system by GPS, processing relating to measurement is executed in accordance with the sequence chart of the later-mentioned actual measuring system (see FIG. 16).

When receiving the measuring start instruction from positional information service server 45, measuring center 50 searches, and acquires the positional information of corresponding mobile unit 10, 20, or 30 from base station ID table 50a, area ID table 50b, sector ID table 50c, etc. in accordance with the telephone number and measuring system included in the measuring start instruction (step S48). Next, measuring center 50 includes the acquired positional information in a measuring end notification, then transmits it back to positional information service server 45 (step S49). Here, the measuring end notification transmitted back to positional information service server 45 includes not only the positional information, but also the acquisition date and time information of the positional information etc. Positional information service server 45 transmits the measuring end notification including the positional information, acquisition date and time information, etc. received from measuring center 50, to mobile unit 10, 20, or 30 requesting the measurement (step S50). Due to this, mobile unit 10, 20, or 30 requesting the measurement can acquire the positional information of its own unit 10, 20, or 30 suitable for the desires of the user.

Even when however acquiring positional information of the base station ID system or area ID system or sector ID system, when "current" is designated as a condition for the measuring time on the input screen illustrated in FIG. 15 or when the limit of range of the measuring time is extremely close to the current time, it is necessary to acquire the positional information of mobile unit 10, 20, or 30 to be measured from simplified mobile phone network 12, mobile phone network 22, mobile packet communication network 32, or other mobile communication network in accordance with the measuring request. In this case, at step S48, measuring center 50 transmits the telephone number of the mobile unit to the service control station of network 12, 22, or 32 providing the mobile unit to be measured to cause the service control station to notify the current positional information of the mobile unit to the measuring center 50. Next, measuring center 50 includes the thus acquired positional information in a measuring end notification, then transmits it to positional information service server 45.

Note that as clear from the above explanation, in the present specification, "measuring" includes searching for, and acquiring corresponding positional information from positional information already acquired and stored in measuring center 50.

<1-5-2. Actual Measuring System>

FIG. 16 is a sequence chart of the case of execution of an actual measuring system by GPS. Note that the sequence chart illustrated explains the case where the terminal requesting measurement transmits a measuring request for its own position to positional information service server 45, that is, the case where the terminal requesting measuring is mobile unit 10, 20, or 30 which to be measured.

In the figure, the processing from steps S51A to S56 is similar to the processing from steps S41A to S46 of the sequence chart of the quasi-measuring system shown in FIG. 14, so explanations thereof will be omitted.

At step S57, positional information service server 45 transmits a measuring start instruction including the telephone number of mobile unit 10, 20, or 30 to be measured, the selected measuring system, etc. to measuring center 50 (step S57). Due to this, measuring center 50 and mobile unit 10, 20, or 30 which to be measured, measure the position by GPS in accordance with measuring protocol determined in advance together (step S58). At this time, positional information service server 45 only relays the data communication executed between measuring center 50 and mobile unit 10, 20, or 30 to be measured.

When the measurement by GPS is completed, measuring center 50 includes the acquired positional information in a measuring end notification, then transmits it back to positional information service server 45 (step S59). Next, positional information service server 45 transmits back the received positional information (including acquisition date and time information), as the measuring end notification, to mobile unit 10, 20, or 30 requesting the measurement (step S60).

Note that measuring center 50 measuring a position by GPS in cooperation with mobile unit 10, 20, or 30 to be measured, may be a GPS measuring center which a business offering a GPS measuring service operates independently, separated from the business operating positional information service server 45. In this case, at step S57, positional information service server 45 transmits a measuring start notification including the telephone number of mobile unit 10, 20, or 30 to be measured, the measuring system, etc., to the GPS measuring center. Due to this, the GPS measuring center and mobile unit 10, 20, or 30 to be measured, measure the position by GPS in accordance with a measuring protocol determined in advance together. The acquired positional information is transmitted from the GPS measuring center to mobile unit 10, 20, or 30 requesting the measurement through positional information service server 45.

<1-6. Search Function>

Figure 17:
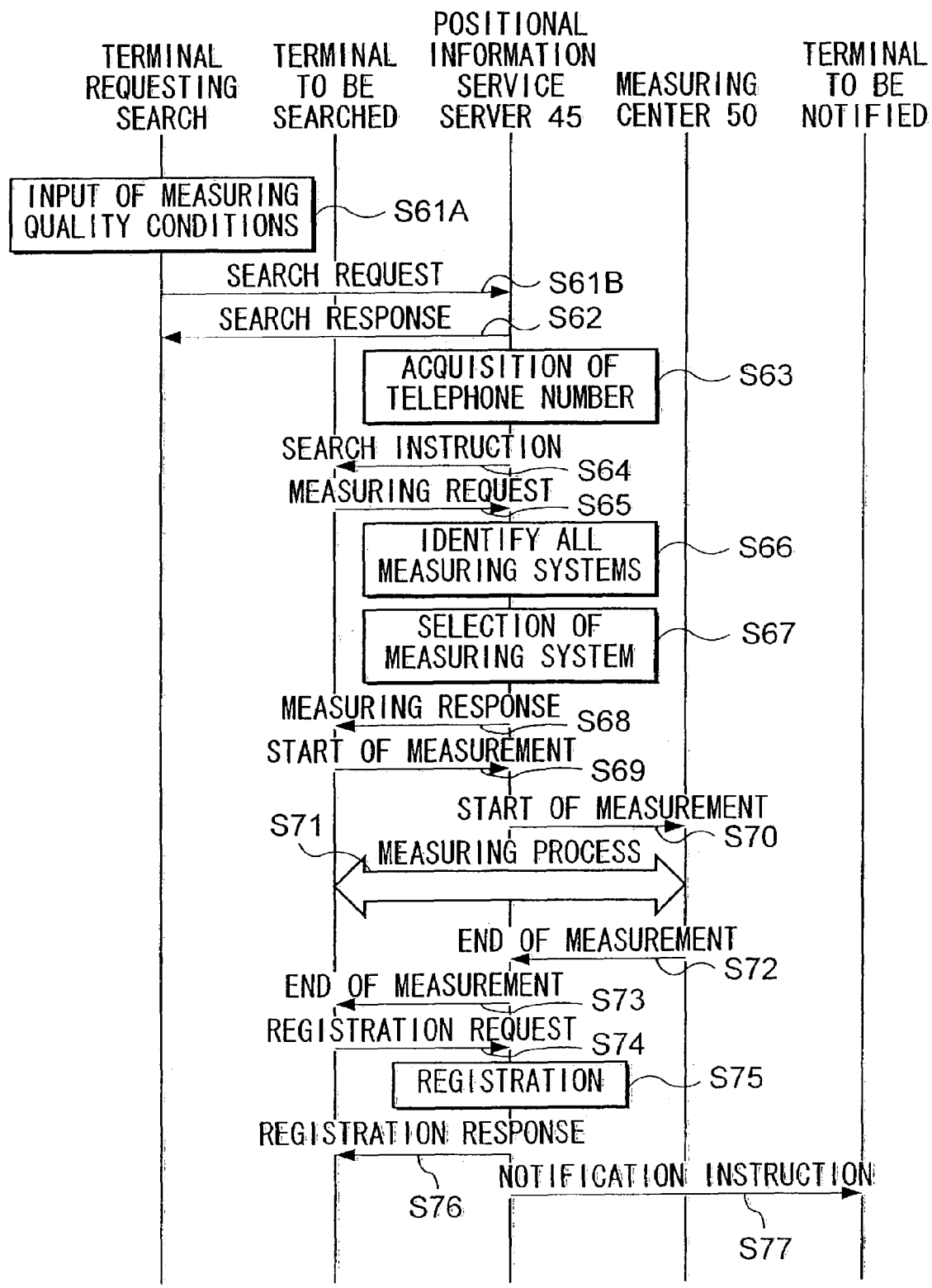
FIG. 17 is a sequence chart explaining the operation of devices when executing a search function of the positional information service according to the present embodiment.

The search function is a function for acquiring the positional information of mobile unit 10, 20, or 30 in accordance with a search request from a third party, and transmitting the positional information to the designated terminal to be notified. A sequence chart for the case of execution of this search function is shown in FIG. 17. Note that in the figure, the "terminal requesting search" and the "terminal to be notified" specifically are mobile units 10, 20, or 30, terminals 80, or IP servers 90. Further, the "terminal to be searched", is a mobile unit 10, 20, or 30. Further, the illustrated example shows the case where the terminal requesting the search, and the terminal to be notified are different. However, the terminal requesting the search, and the terminal to be notified may also be the same terminal. Further, the terminal to be searched may also be the terminal to be notified.

As shown in the figure, firstly, the terminal requesting the search executes processing for prompting the user to input the measuring quality conditions necessary for the search request (step S61A). At this time, the terminal requesting the search displays an input screen similar to that illustrated in FIG. 15, and the party requesting the search (user) inputs the measuring quality conditions etc. in accordance with the input screen. Here, at the time of requesting the search, as the measuring quality conditions, the measuring time, measuring precision, rate, allowable waiting time, and other conditions, and the priority order of these conditions are input. Further, in addition to the measuring quality conditions, subscriber information identifying mobile unit 10, 20, or 30 which to be searched or the terminal to be notified is input.

Next, the terminal requesting the search transmits a search request to positional information service server 45 (step S61B). This search request includes an instruction instructing a search, the subscriber ID of the unit requesting the search, subscriber information identifying mobile unit 10, 20, or 30 to be searched, subscriber information identifying the terminal to be notified, the measuring quality conditions input at step S61A, etc.

When receiving the search request, positional information service server 45 transmits a search response indicating that receipt of the search request back to the terminal requesting the search (step S62). Next, positional information service server 45 searches through subscriber information database 453, as a key that the subscriber information identifying mobile unit 10, 20, or 30 to be searched included in the received search request, and acquires the telephone number of mobile unit 10, 20, or 30 to be searched (step S63). Next, positional information service server 45 transmits a search instruction to mobile unit 10, 20, or 30 to be searched (step S64). By receiving the search instruction, the user of the mobile unit 10, 20, or 30 which to be searched can confirm that its own position is being searched for by a third party.

When the user authorizes the search by the third party, mobile unit 10, 20, or 30 to be searched transmits a measuring request to positional information service server 45 (step S65). In response to this, positional information service server 45 first refers to measuring system database 454, and identifies all of the measuring systems able to measure position of mobile unit 10, 20, or 30 to be searched (step S66). Next, positional information service server 45 selects the measuring system most suitable for the measuring quality conditions received from the terminal requesting the search among the identified measuring systems (step S67).

Next, positional information service server 45 transmits a measuring response including information relating to the selected measuring system back, to mobile unit 10, 20, or 30 to be searched (step S68). Due to the receipt of the measuring response, the user of mobile unit 10, 20, or 30 to be searched, can confirm the measuring system of positional information of its own unit acquired by the third party. Further, when the measuring system is authorized by the user, mobile unit 10, 20, or 30 to be searched transmits a measuring start instruction back to positional information service server 45 (step S69). Note that at step S68, positional information service server 45 may be configured to transmit a measuring response including information relating to the selected measuring system to the terminal requesting the search as well. According to this configuration, the user of the terminal requesting the search can also confirm the measuring system used.

When receiving a measuring start instruction from mobile unit 10, 20, or 30 to be searched, positional information service server 45 transmits a measuring start instruction including the telephone number of mobile unit 10, 20, or 30 to be searched, and the selected measuring system etc., to measuring center 50 (step S70). In response to this, measuring center 50 acquires the positional information of mobile unit 10, 20, or 30 to be searched by the quasi-measuring system, or actual measuring system in accordance with the designated measuring system (step S71). When the measuring is completed, measuring center 50 includes the acquired positional information in a measuring end notification, and transmits it back to positional information service server 45 (step S72). Next, positional information service server 45 transmits the measuring end notification to mobile unit 10, 20, or 30 to be searched (step S73).

Next, mobile unit 10, 20, or 30 to be searched, transmits a registration request to positional information service server 45 (step S74). When receiving the registration request, positional-information service server 45 registers the positional information, and the subscriber ID of mobile unit 10, 20, or 30 to be searched, etc included in the registration request, in positional information registration database 455 (step S75). Next, positional information service server 45 transmits a registration response back to mobile unit 10, 20, or 30 to be searched (step S76).

Next, the positional information service server 45 searches through subscriber information database 453, and identifies the terminal to be notified, as a key that the subscriber information identifying the terminal to be notified received at step S61B. Next, positional information service server 45 includes the acquired positional information, associated information, etc. in a notification instruction, then transmits it to the terminal to be notified (step S77).

Note that positional information service server 45 may be configured so that, after receiving the measuring end notification from measuring center 50 at step S72, it immediately registers the positional information of mobile unit 10, 20, or 30 to be searched, the subscriber ID of mobile unit 10, 20, or 30, etc. included in the measuring end notification, in positional information registration database 455, transmits the measuring end notification to mobile unit 10, 20, or 30 to be searched, and transmits the notification instruction to the terminal to the notified.

Further, after step S77, positional information service server 45 may transmit a notification completion instruction indicating that the notification has been completed, to the terminal requesting the search. Further, in the sequence chart of the search function, positional information service server 45 was configured to register the acquired positional information in positional information registration database 455. Positional information service server 45, however, may also transmit the acquired positional information to the terminal to be notified without registration in positional information registration database 455.

<2. Application to Information Provision Services>

When applying the positional information service to the various information provision services using positional information, if dividing the mode of application to the information provision services by function of the positional information service, a total of four modes can be considered, which are, a self position search function, a self position registration function, a third party position registration function, and a third party position search function. Below, an example of the operation for these functions will be explained.

<2-1. Self Position Search Function>

Figure 18:
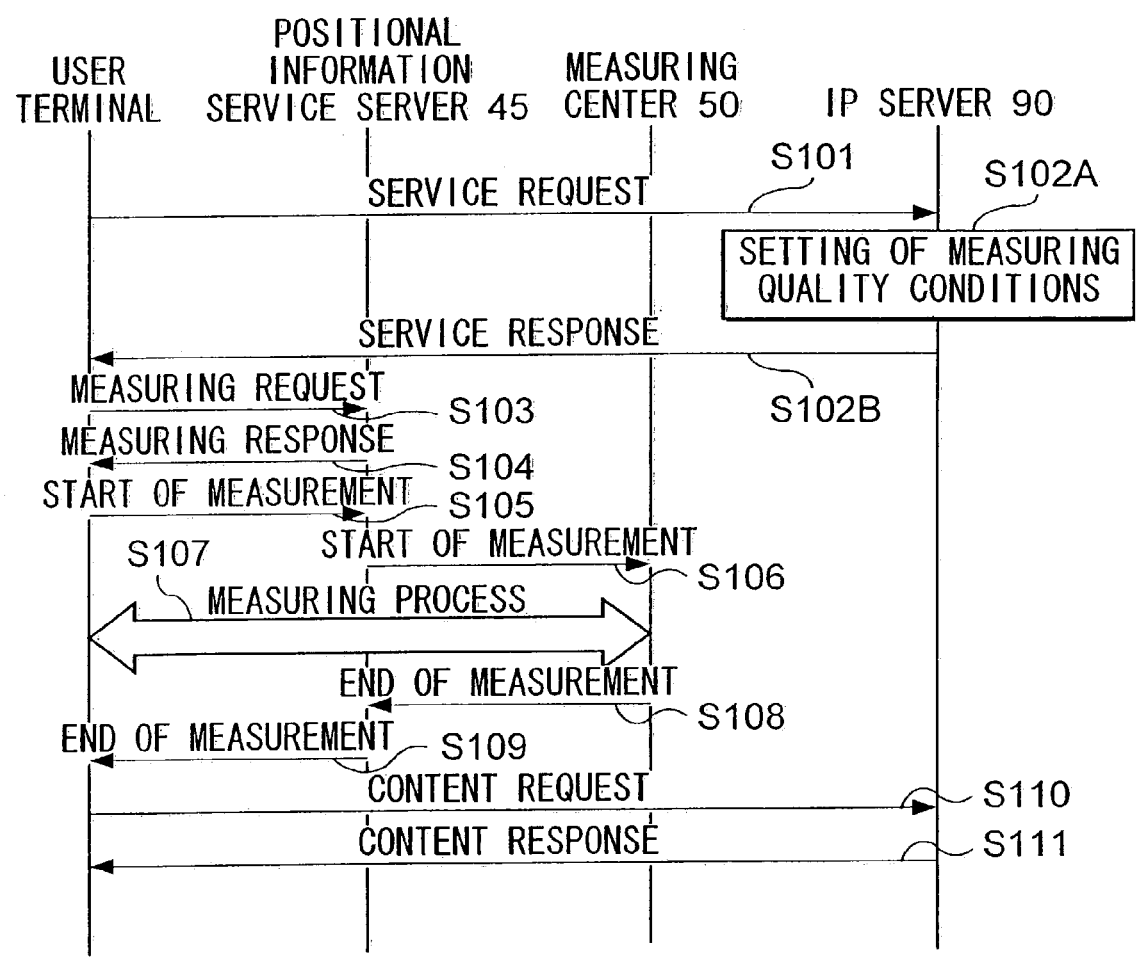
FIG. 18 is a sequence chart explaining the operation of devices in an information provision service using a self position search function of the positional information service according to the present embodiment.

As a mode of application of the self position registration function, for example, the mode of use of the positional information of a mobile unit 10, 20, or 30 acquired by the positional information service may be considered at a map portal site or general WWW (World Wide Web) site etc. A sequence chart illustrating the operation of the devices in the information provision service using this self position search function is shown in FIG. 18. Note that in this figure, the user terminal is specifically a mobile unit 10, 20, or 30.

As shown in the figure, first, the user terminal transmits a service request to an IP server 90 offering this information provision service (step S101). In response to this, IP server 90 sets the measuring quality conditions of the positional information suitable for use in the information provision service, and information designating the data format, etc. (step S102A). Next, IP server 90 transmits a service response including the set measuring quality conditions, information designating the data format, etc., to the user terminal (step S102B).

When receiving a service response from IP server 90, the user terminal includes the measuring quality conditions, information designating the data format, etc. included in the service response, in a measuring request, then transmits it to the positional information service server 45 (step S103). However, the measuring quality conditions etc. may also be confirmed for checking content or changed by the user.

Next, the processing from step S104 to step S109 is the processing for positional information service server 45 acquiring the positional information of the user terminal in accordance with a measuring request from the user terminal, and notifying the acquired positional information to the user terminal. The processing from steps S104 to S109 is shown simplified in FIG. 18, but is similar to the processing from steps S43 to 50 of the sequence chart of the quasi-measuring system shown in FIG. 14, so the explanation is omitted.

When receiving a measuring end notification from positional information service server 45 (step S109), the user terminal includes positional information of its own unit included in the measuring end notification, in a content request, then transmits it to IP server 90 (step S110). In response to this, IP server 90 acquires the content in accordance with the position shown by the positional information of the user terminal and transmits the content as a content response to the user terminal (step S111). In this way, in an information provision service utilizing a self position search function, IP server 90 can set measuring quality conditions suitable for use in the information provision service, information designating the data format, etc. for positional information of its own unit acquired at the user terminal.

Note that in the sequence chart shown in FIG. 18, after step S108, positional information service server 45 may be configured to execute processing for registering the positional information of the user terminal acquired in positional information registration database 455 and to include only associated information such as the registration time of the positional information, without the positional information of the user terminal, in the content request transmitted from the user terminal to IP server 90 at step S110.

In this case, IP server 90 receiving the content request from the user terminal uses the above-mentioned reference function (see FIG. 11) to refer to the positional information of the user terminal registered in positional information service database 455. That is, IP server 90 transmits a reference request including an instruction instructing reference, the subscriber ID of IP server 90, the subscriber information identifying the user terminal, etc. to positional information service server 45. When receiving the reference request, positional information service server 45 acquires the corresponding positional information from positional information registration database 455 based on the reference request, and transmits a reference response including that positional information to IP server 90. Next, IP server 90 acquires the content corresponding to the position shown by the positional information of the user terminal included in the received reference response, and transmits that content as the content response, to the user terminal.

<2-2. Self Position Registration Function>

Figure 19:
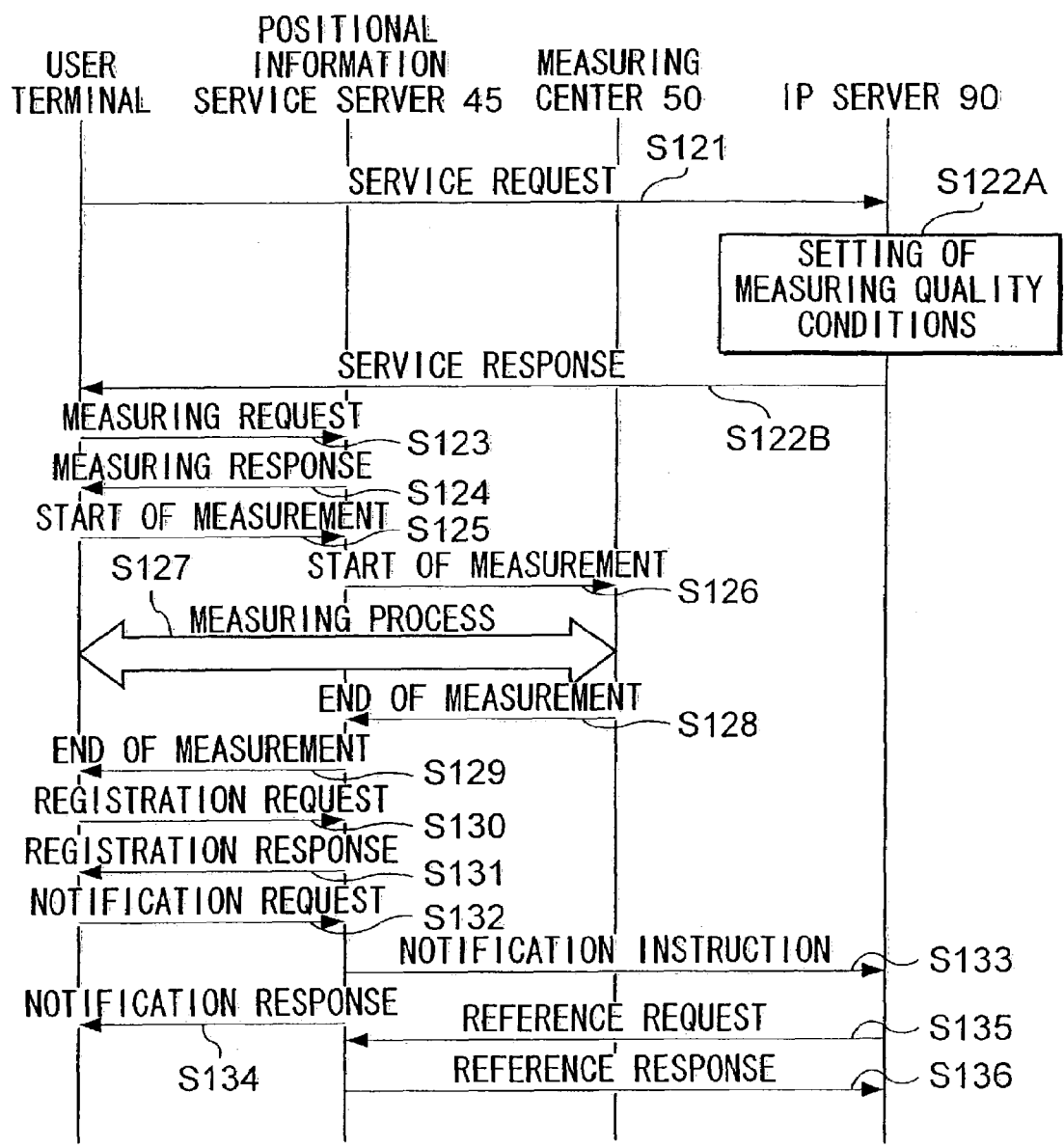
FIG. 19 is a sequence chart explaining the operation of devices in an information provision service using a self position search function of the positional information service according to the present embodiment.

As the mode of application of the self position registration function, for example, a mode where a map portal site or other WWW site acquires the positional information of a user terminal registered in positional information service server 45, and uses that positional information for an information provision service etc. may be considered. A sequence chart illustrating the operation of the devices in an information provision service using this self position registration function is shown in FIG. 19. Note that in this figure, the user terminal is specifically a mobile unit 10, 20, or 30. Further, in the sequence chart shown in the figure, the processing from steps S121 to S129 is similar to the processing from steps S101 to S109 of the sequence chart shown in FIG. 18, so the explanation will be omitted.

At step S129, when receiving a measuring end notification from positional information service server 45 (step S129), the user terminal registers positional information of its own unit included in the measuring end notification in positional information registration database 455 by using the above registration function (see FIG. 10). That is, firstly, the user terminal transmits a registration request to positional information service server 45 (step S130). When receiving the registration request, positional information service server 45 registers the positional information or subscriber ID of the user terminal included in the registration request, in positional information registration database 455. Next, positional information service server 45 transmits a registration response back to the user terminal (step S131).

Next, the user terminal uses the above notification function (see FIG. 13) to notify the fact that positional information of its own unit has been registered in positional information registration database 455. That is, firstly, the user terminal transmits a notification request to positional information service server 45 (step S132). This notification request includes an instruction instructing notification, the subscriber ID of the user terminal, information identifying IP server 90 to be notified, etc. When receiving the notification request, positional information service server 45 identifies the communication address of IP server 90 to be notified based on the notification request. Next, positional information service server 45 transmits a notification instruction indicating that the positional information of the user terminal has been registered in positional information registration database 455, to IP server 90 (step S133). Further, next, positional information service server 45 transmits a notification response back to the user terminal (step S134).

On the other hand, IP server 90 receiving a notification instruction from positional information service server 45 uses the above reference function (see FIG. 11) to refer to the positional information of the user terminal registered at positional information registration database 455. That is, IP server 90 transmits a reference request including an instruction instructing reference, the subscriber ID of IP server 90, subscriber information identifying the user terminal, etc., to positional information service server 45 (step S135). When receiving the reference request, positional information service server 45 acquires the corresponding positional information from positional information registration database 455 based on this reference request. Next, positional information service server 45 transmits a reference response including the acquired positional information back to IP server 90 (step S136). In this way, in an information provision service using a self position search function, IP server 90 can acquire positional information of the user terminal registered in positional information service server 45, and use that positional information for the information provision service.

Note that the measuring end notification transmitted from measuring center 50 to the positional information service server 45 at step S128 includes positional information of the user terminal, the subscriber ID of the user terminal, etc. Therefore, the positional information service server 45 may be configured to register the positional information of the user terminal or the subscriber ID included in the measuring end notification immediately, in positional information registration database 455 after receiving the measuring end notification from measuring center 50 at step S128. In this case, the processing of steps S130 and S131 becomes unnecessary. Further, at step S132, the notification request transmitted from the user terminal to positional information service server 45 does not have to include the positional information of the user terminal.

<2-3. Third Party Position Search Function>

Figure 20:
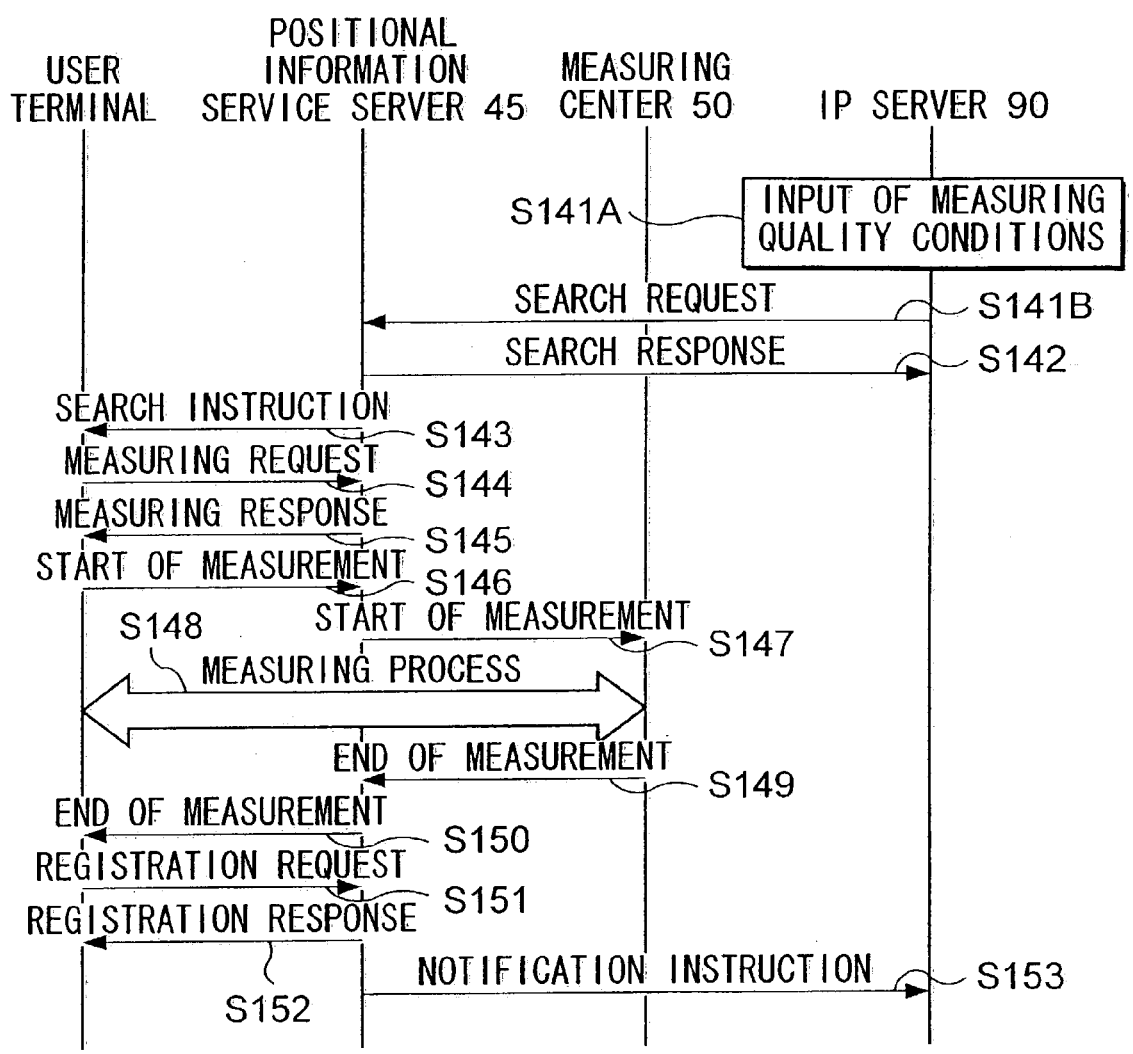
FIG. 20 is a sequence chart explaining the operation of devices in an information provision service using a third party position search function of the positional information service according to the present embodiment.

As the mode of application of the third party search function, for example, the mode may be considered where a map portal site or other WWW site acquires positional information of the user terminal by using the positional information service, and uses that positional information for the positional information service. A sequence chart illustrating the operation of devices in the information provision service using this third party position search function is shown in FIG. 20. Note that the "user terminal" in this figure is specifically a mobile unit 10, 20, or 30.

The sequence chart shown in the figure only shows the case of the sequence chart of the search function shown in FIG. 17 where the terminal requesting the search and the terminal to be notified are the same terminal, the terminal is IP server 90, and the terminal to be measured is the user terminal. In FIG. 20, the processing is shown simplified, but the basic operation is similar to the search function shown in FIG. 17. Therefore, here, the explanation of the operation of the third party search function is omitted, but in the information provision service using this third party search function, IP server 90 can use the positional information service to acquire the positional information of the user terminal, and use this positional information for the information provision service.

<2-4. Third Party Position Registration Function>

Figure 21:
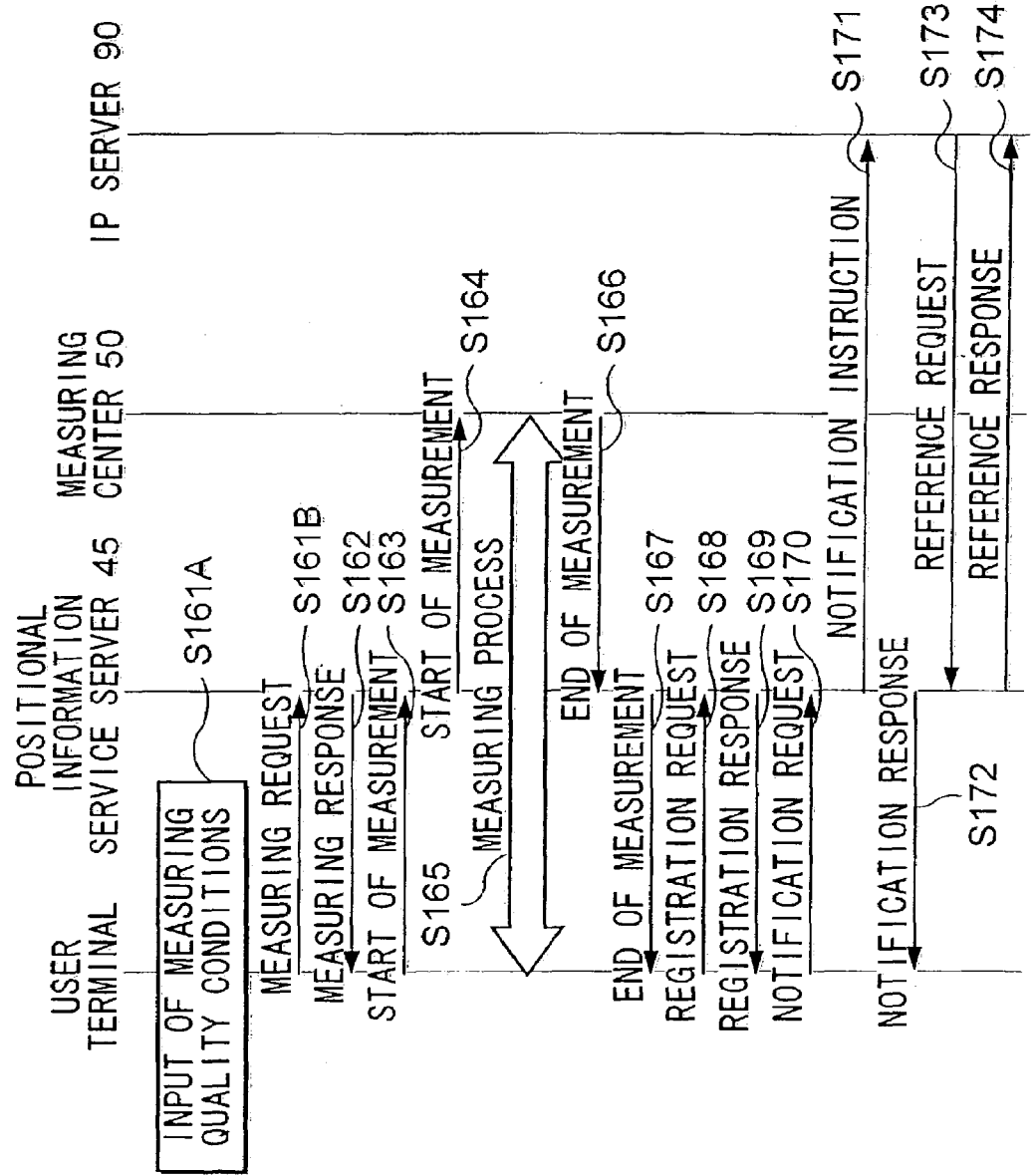
FIG. 21 is a sequence chart explaining the operation of devices in an information provision service using a third party position search function of the positional information service according to the present embodiment.

As the mode of application of the third party registration function, the mode may be considered where the user terminal registers positional information of its own unit having a measuring quality in accordance with the desires of the user in positional information service server 45 in advance, and the map portal site or other WWW site acquires the positional information of the user terminal registered in the positional information service server 45, and uses that positional information for the information provision service. A sequence chart illustrating the operation of devices in the information provision service using this third party position registration function is shown in FIG. 21. Note that in the figure, the "user terminal" is specifically a mobile unit 10, 20, or 30.

In the sequence chart shown in this figure, the portion different from the sequence chart of the self position registration function shown in FIG. 19 is whether the measuring quality conditions are set by IP server 90 or set by the owner of the user terminal (step S161A). Here, in the case of the third party registration function, the measuring quality conditions are set by the owner of the user terminal so as to impose a certain restriction on the positional information of its own unit to which IP server 90 or another third party is allowed to refer.

That is, in the case of the self position registration function, the measuring quality conditions are set by IP server 90, so IP server 90 or another third party can acquire the positional information of the user terminal suited to its own desires. Some owners of user terminals, however, for example, may have the desire of allowing a relatively low precision of their own positional information such as by the area ID system to be disclosed to third parties, but not allowing a high precision of their own positional information by the GPS system to be disclosed to third parties.

In such a case, by using the third party position registration function, only the positional information in accordance with the desire of the owner of the user terminal is disclosed to IP server 90 or another third party side through positional information service server 45, so it becomes possible to disclose to a third party only a relatively low precision of own positional information such as by the area ID system. Note that with the exception of the above step S161A, the processing from steps S161B to S174 is similar to the processing from steps S123 to S136 of the sequence chart of the self position registration shown in FIG. 19, so the explanation will be omitted.

Further, in the sequence chart shown in FIG. 21, it is also possible for positional information service server 45 to receive the measuring end notification from measuring center 50 at step S166, and then immediately register the positional information of the user terminal or its subscriber ID included in the measuring end notification, in the positional information registration database 455. In this case, the processing of steps S168 and S169 becomes unnecessary. Further, at step S170, the notification request transmitted from the user terminal to the positional information service server 45 does not have to include the positional information of the user terminal.

As explained above, according to the present embodiment, when positional information service server 45 can measure the position of a mobile unit 10, 20, or 30 designated to be measured by a plurality of measuring systems, it selects the measuring system most suitable for the measuring quality conditions received from the terminal requesting the measuring. Further, positional information service server 45 acquires the positional information of mobile unit 10, 20, or 30 based on the selected measuring system, and transmits it to the terminal designated to be notified.

Therefore, the user of the positional information service can easily acquire positional information suited to user's own desires. For example, in the case of a third party position search etc., even without knowing the measuring systems able to measure the position of mobile unit 10, 20, or 30 to be measured, by inputting just the measuring quality conditions in accordance with the screen instructions, positional information service server 45 automatically selects the optimal measuring system, and supplies the positional information of mobile unit 10, 20, or 30 by that measuring system, to the user. Further, even a user unfamiliar with the direct designation of the measuring system can acquire positional information in accordance with the user's own desires by just inputting the measuring quality conditions in accordance with the screen instructions. According to this embodiment, it is possible to improve the convenience of the positional information service.

<B. Modifications>

Above, an explanation was given of an embodiment of the present invention, but this embodiment is merely an illustration. Various modifications are possible within a scope not out of the gist of the present invention. As modifications, for example, the following may be considered.

<First Modification>

In the above embodiment, positional information service server 45 was configured to select the measuring system most suitable for the measuring quality conditions and, to acquire the positional information of a mobile unit 10, 20, or 30 by this measuring system. Sometimes, however, it is not possible to acquire positional information by the selected measuring system. For example, when measuring the position of a mobile phone 30 having a built-in GPS receiver 34, sometimes the GPS system will be selected as the measuring system. Here, when the GPS measuring center supporting the measurement by this GPS system is not operating due to maintenance etc., it is not possible to measure the position of a mobile unit 10, 20, or 30 by the GPS system. Envisioning such a case, it is also possible to configure the control as follows.

FIG. 22 is a view illustrating the data configuration of a measuring center table 500 stored in positional information service server 45 in the first modification. As shown in the figure, measuring center table 500 stores an operation flag showing if the measuring center is currently operating for the identification information (measuring center ID) of each measuring center. In the illustrated example, "1" is stored for the operation flag when the center is operating, while "0" is stored when it is not operating.

Positional information service server 45 communicates with the measuring centers, and changes the value of a corresponding operation flag in measuring center table 500 from "1" to "0" when receiving an instruction for stopping operation from a measuring center or when there is no response from a measuring center. Positional information service server 45 confirms the operation of the measuring centers by referring to measuring center table 500.

Figure 23:
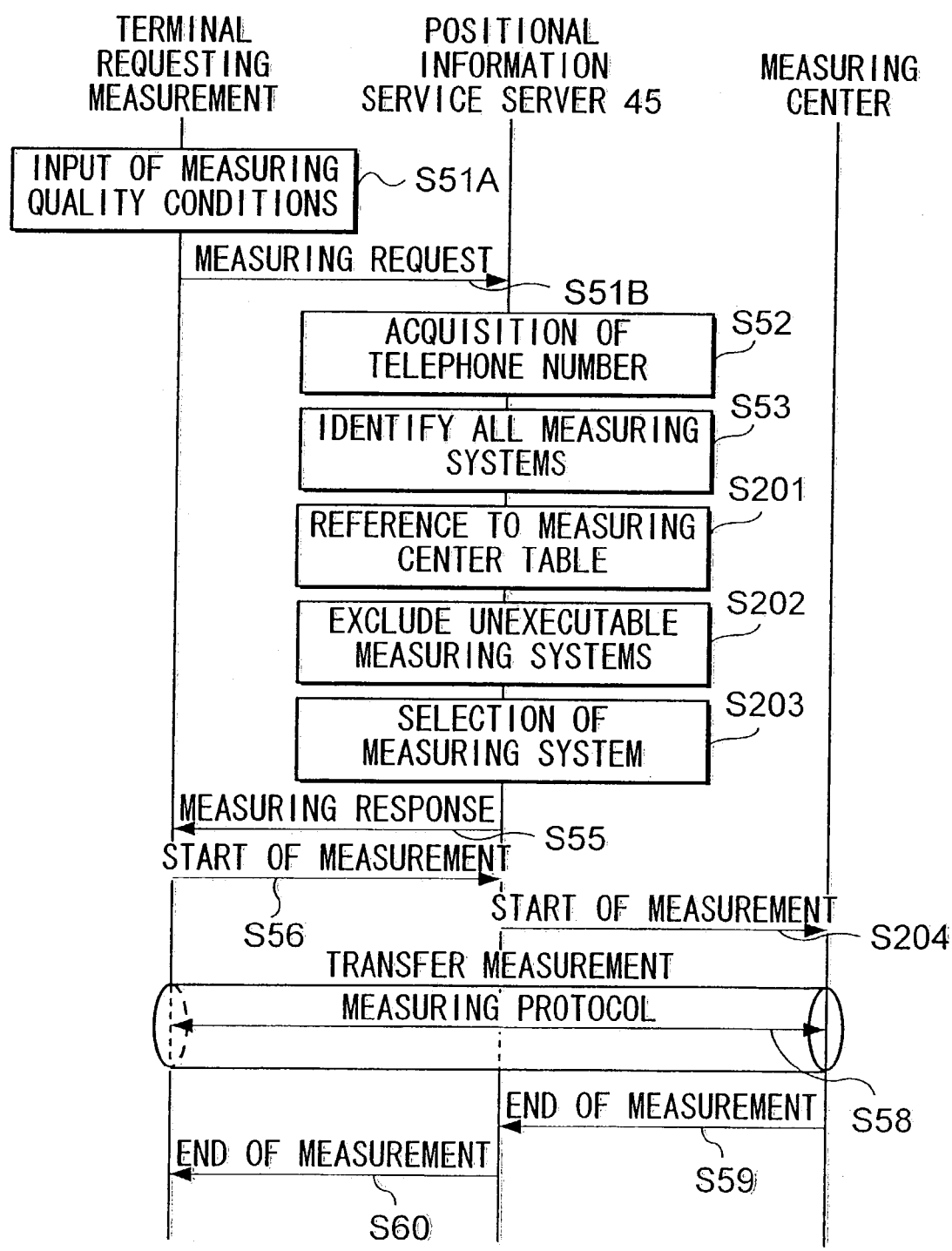
FIG. 23 is a sequence chart showing a modification of the measuring function (actual measuring function) shown in FIG. 16 according to the first modification.

Next, FIG. 23 is a sequence chart showing a modification of the measuring function (actual measuring system) shown in FIG. 16. Note that here only the portions different from the sequence chart shown in FIG. 16 will be explained.

At step S53, positional information service server 45 refers to measuring system database 454, and identifies all measuring systems able to measure the position of mobile unit 10, 20, or 30 to be measured. Next, positional information service server 45 confirms whether the measuring center supporting the measurement by the measuring system is operating by referring to measuring center table 500 for each identified measuring system (step S201). As a result, when there is a measuring center not operating, positional information service server 45 excludes the corresponding measuring system (step S202), and selects the measuring system most suitable for the measuring quality conditions received from the terminal requesting the measurement from the remaining measuring systems (step S203).

Next, positional information service server 45 transmits a measuring response including information relating to the selected measuring system back, to terminal requesting the measurement (step S45). Note that when there is no longer any executable measuring system as a result of positional information service server 45 excluding measuring systems corresponding to measuring centers not operating at step S202, the server includes a message to the effect that measuring is not possible, in the measuring response, then transmits it back to the terminal requesting the measurement.

Further, when receiving a measuring start instruction from the terminal requesting the measurement (step S46), positional information service server 45 transmits a measuring start instruction including the telephone number of mobile unit 10, 20, or 30 to be measured and the measuring system etc., to the measuring center supporting the measurement by the measuring system selected at step S203 (step S204). Note that FIG. 23 shows the case of actual measuring system, but can also be applied to the case of a quasi-measuring system.

<Second Modification>

Further, in relation to the above first modification, the following case may also be considered.

For example, in the same way as the above first modification, consider the case where the GPS system is selected as the measuring system when measuring the position of a mobile phone 30 with a built-in GPS receiver 34. Here, when mobile phone 30 is positioned in between tall buildings, underground, etc. and cannot receive the radio waves from the plurality of GPS satellites, it cannot measure the position by the GPS system. Envisioning such a case, it is also possible to execute the following control in addition to that of the first modification.

Figure 24:
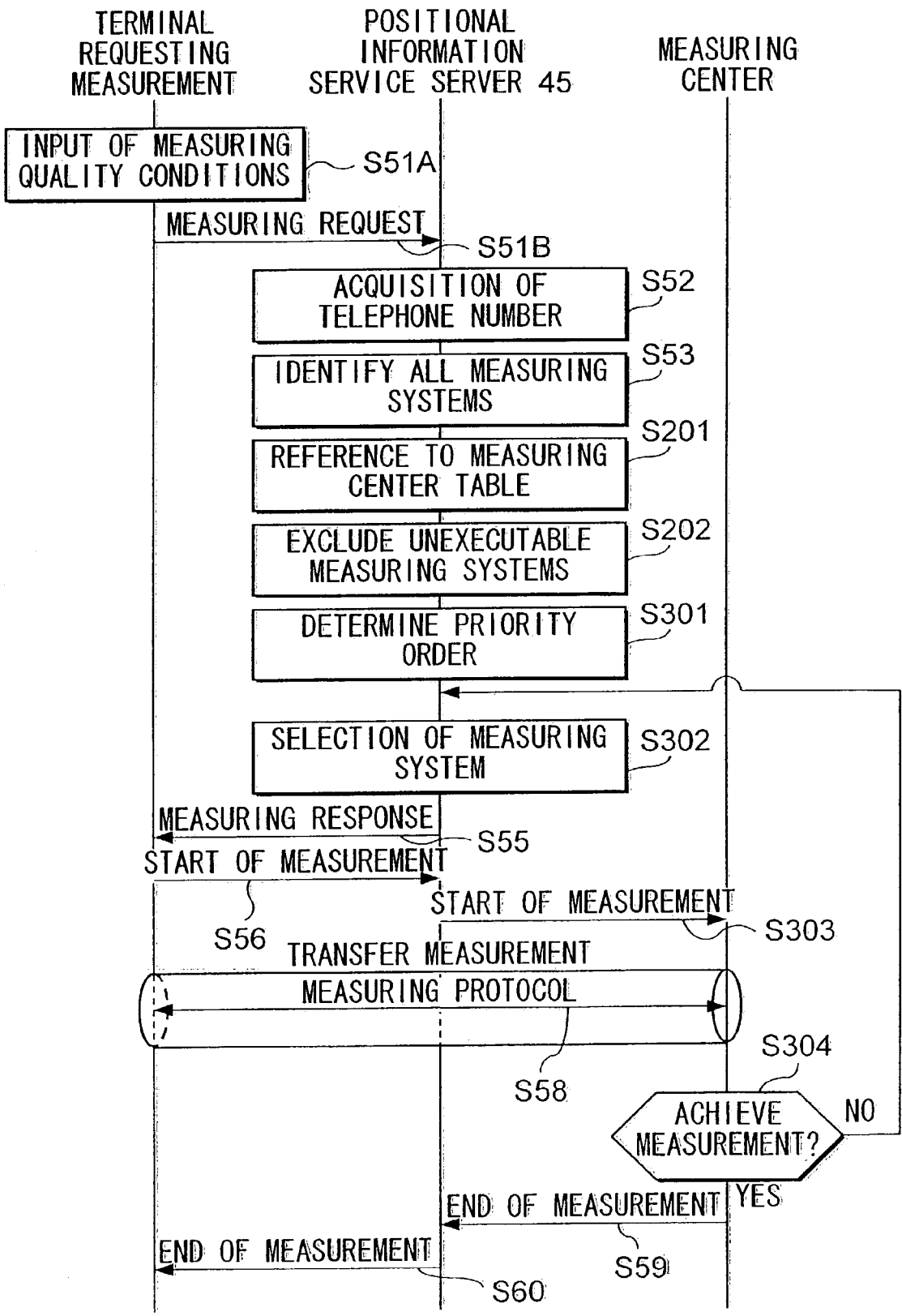
FIG. 24 is a sequence chart showing another modification of the measuring function (actual measuring function) shown in FIG. 16 according to the second modification.

FIG. 24 is a sequence chart showing another modification of the measuring function shown in FIG. 16 (actual measuring system). Note that here only portions different from the sequence chart shown in FIG. 23 will be explained.

At step S202, positional information service server 45 excludes the measuring systems corresponding to not operating measuring centers from all of the measuring systems able to execute the measurement. Next, positional information service server 45 determines the priority order using the measuring systems in accordance with the measuring quality conditions received from the terminal requesting the measurement for the remaining measuring systems (step S301). Here, a higher priority order is set for a measuring system more suitable for the measuring quality conditions.

Next, positional information service server 45 selects the one measuring system with the highest priority order from the measuring systems for which the priority order was set (step S302), and transmits a measuring response including this measuring system back to the terminal requesting the measuring (step S55). Further, when receiving a measuring start instruction from the terminal requesting measurement (step S56), positional information service server 45 transmits a measuring start instruction including the telephone number of mobile unit 10, 20, or 30 to be measured, and the measuring system, etc., to the measuring center corresponding to the measuring system selected at step S302 (step S303). Due to this, measurement of the position by GPS is executed between the measuring center and terminal to be measured in accordance with a measuring protocol determined in advance. (step S58).

Next, the measuring center determines whether the position of the corresponding mobile unit 10, 20, or 30 is measured by that measuring system (step S304). When the result is that the position of corresponding mobile unit 10, 20, or 30 is measured (YES at step S304), the measuring center includes the acquired positional information in the measuring end notification, then transmits it back to positional information service server 45 (step S59). On the other hand, when the result at step S304 is that the position of the corresponding mobile unit 10, 20, or 30 is not measured (NO at step S304), it transmits a measuring failure notification indicating that measuring was not possible back, to positional information service server 45.

When receiving a measuring failure notification from the measuring center, positional information service server 45 returns to step S302, and selects the measuring system of the next highest priority order from the measuring systems for which the priority order was set (step S302). Next, positional information service server 45 uses this measuring system to execute the measuring process again. With such a configuration, even when measurement is not possible by the measuring system most suitable for the measuring quality conditions, positional information service server 45 can execute measuring by the measuring system of the next highest priority order in accordance with the priority order set based on the measuring quality conditions. Note that FIG. 24 shows the case of an actual measuring system, but can also be applied to the case of a quasi-measuring system.

<Third Modification>

In the above embodiment, the following control may be executed when a mobile unit 10, 20, or 30 acquires positional information on its own unit 10, 20, or 30.

Figure 25:
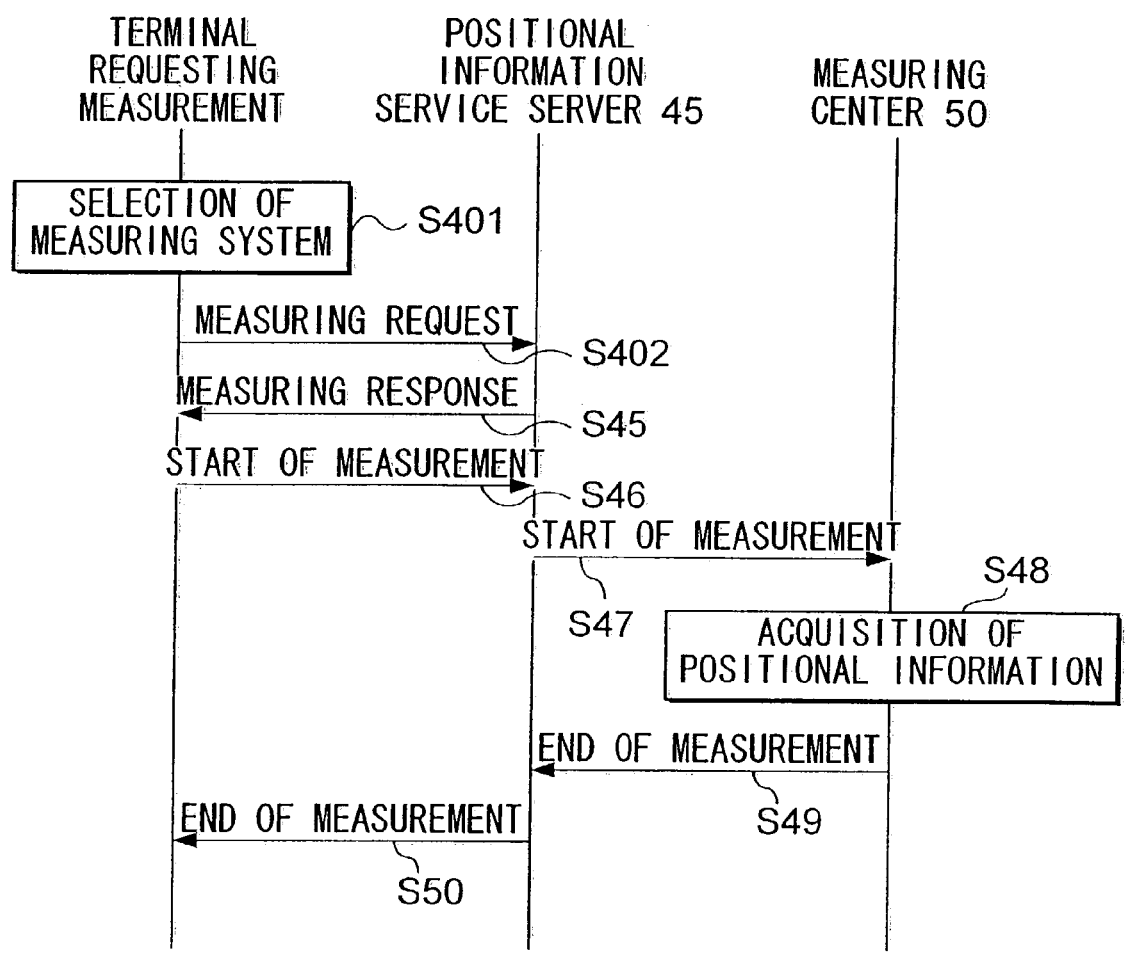
FIG. 25 is a sequence chart showing a modification of the measuring function (quasi-measuring function) shown in FIG. 14 according to a third modification.
Figure 26:
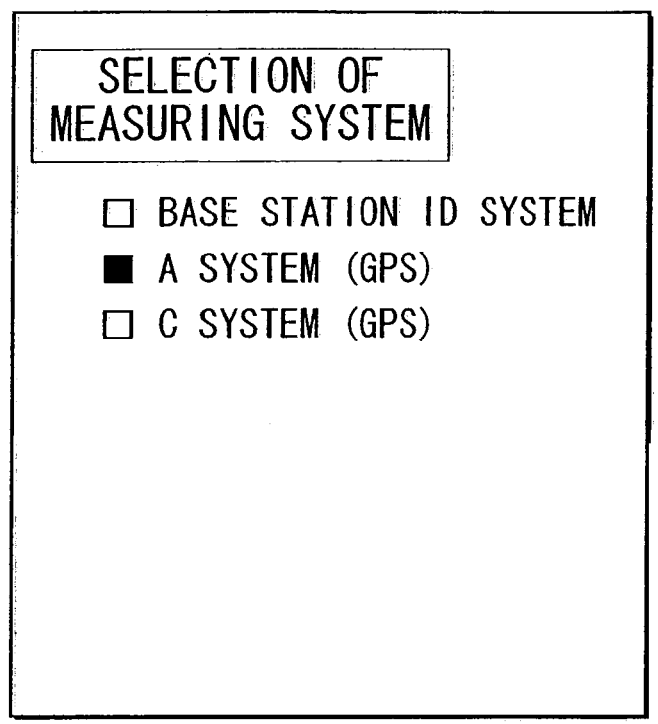
FIG. 26 is a diagram showing an example of the screen display of the scene when selecting a measuring system at the service terminal according to the third modification.

FIG. 25 is a sequence chart showing a modification of the measuring function shown in FIG. 14 (quasi-measuring system). Note that here only portions different from the sequence chart shown in FIG. 14 will be explained.

Firstly, mobile unit 10, 20, or 30 according to the third modification holds information of all measuring systems able to acquire positional information of its own unit 10, 20, or 30 in an internal memory. Further, mobile unit 10, 20, or 30 displays on its screen, a list of all of the measuring systems able to acquire the positional information of its own unit 10, 20, or 30, and prompts the user to select a measuring system (step S401) when requesting measurement to positional information service server 45.

Next, mobile unit 10, 20, or 30 includes the information of the measuring system which the user has selected, in the measuring request, then transmits it to positional information service server 45 (step S402). Next, positional information service server 45 measures position of mobile unit 10, 20, or 30 requesting the measurement by the measuring system selected by the user. With this configuration, when desiring to acquire positional information of its own unit 10, 20, or 30, the user can select the measuring system to be used from the plurality of measuring systems able to measure the position of its own unit 10, 20, or 30.

Figure 27:
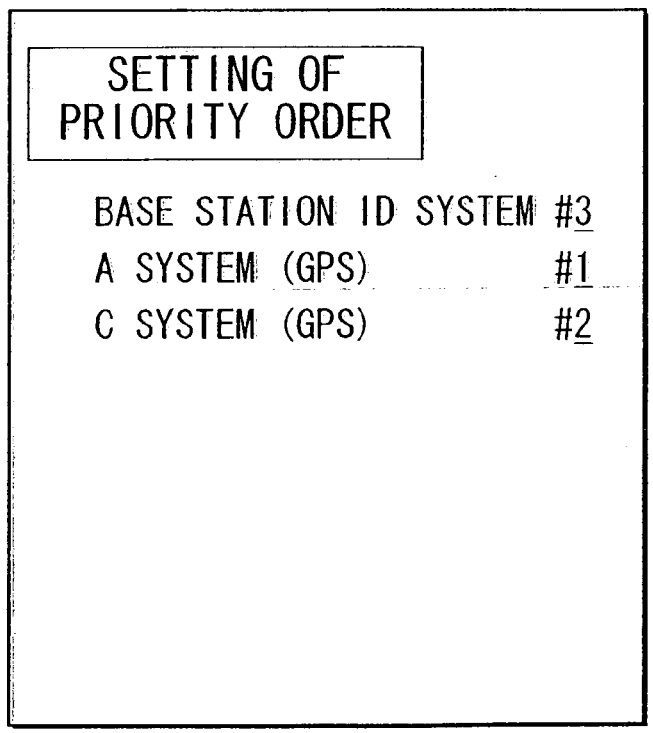
FIG. 27 is a diagram showing an example of the screen display of the scene when setting the priority order of measuring systems in the service terminal according to the third modification.

Further, as shown in FIG. 27, it is also possible to have the user set the priority order using measuring systems able to measure the position of its own unit 10, 20, or 30, to include information relating to the priority order in the measuring request, then to transmit it to positional information service server 45. In this case, positional information service server 45 starts measurement using the measuring system with the highest priority order. When the measurement is not possible, it then measures the position of the mobile unit 10, 20, or 30 by the measuring system of the next highest priority order.

Further, it is also possible to configure that mobile unit 10, 20, or 30 displays an input screen of the measuring quality conditions shown in FIG. 15, selects the measuring system for use from the plurality of measuring systems able to measure the position of its own unit 10, 20, or 30 in accordance with the measuring quality conditions which the user inputs, includes the information relating to the selected measuring system, in the measuring request, then transmits it to positional information service server 45.

<Fourth Modification>

In the above embodiment, the positional information provision system comprised of a positional information service server 45, measuring center 50, positional information conversion apparatus 60, etc. may also link up with an existing positional information provision system to acquire positional information of a mobile unit subscribing to the positional information service provided by the existing positional information provision system (hereinafter called an "existing positional information service").

Figure 28:
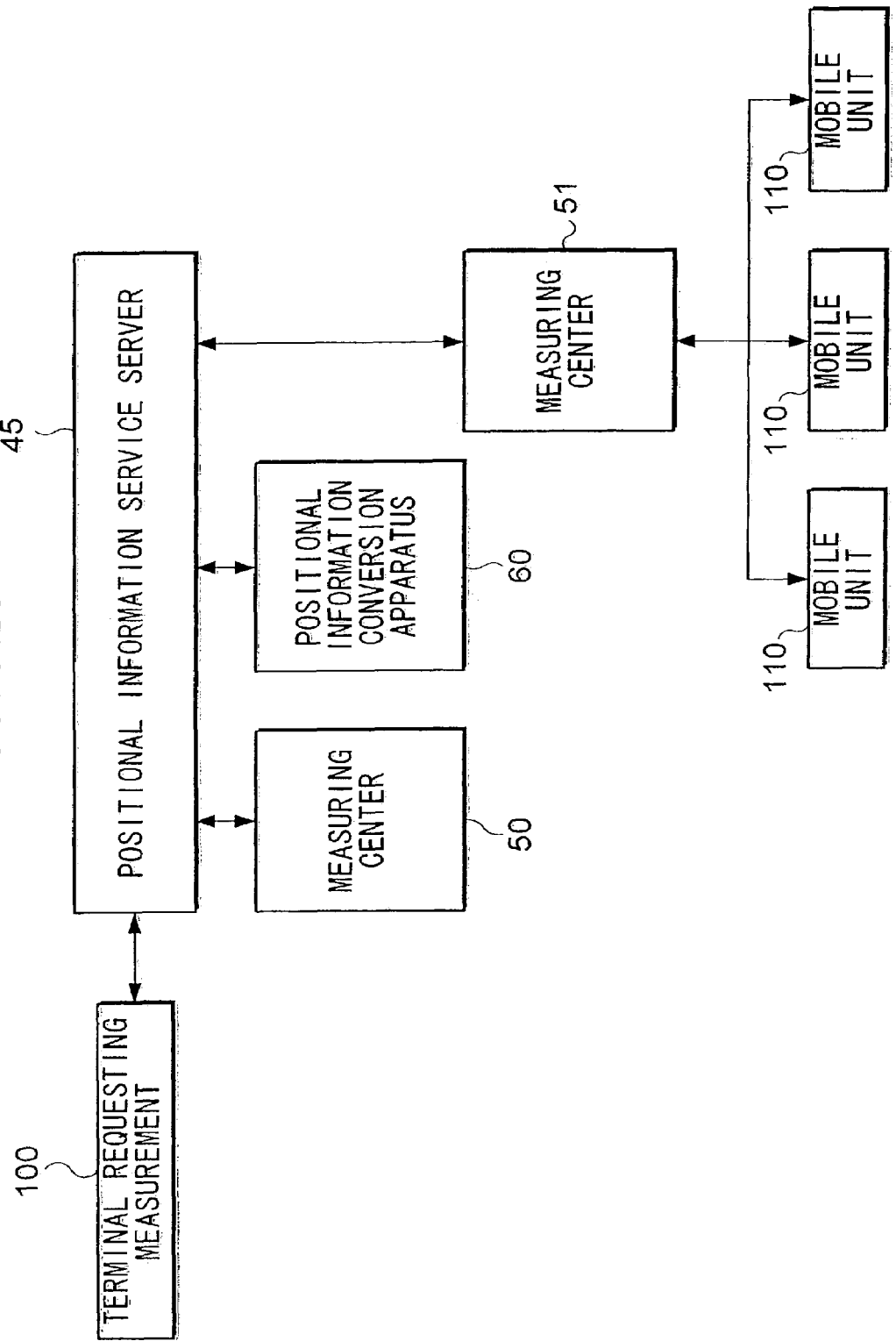
FIG. 28 is a diagram showing an outline of the configuration of the communication system according to a fourth modification of the present invention.

FIG. 28 is a view of an outline of the configuration of the communication system according to a fourth modification. In the figure, a measuring center 51 is a measuring center of an existing positional information provision system. This measuring center 51 has the function of measuring the position of mobile units 110 subscribing to the existing positional information service, and of storing the positional information.

Further, FIG. 29 is a view illustrating the data configuration of a subscriber information database 600 stored in positional information service server 45 shown in FIG. 28. Subscriber information database 600 is stored instead of subscriber information database 453 shown in FIG. 8, and stores the subscriber information of the existing positional information service in addition to the subscriber information of the positional information service provided by positional information service server 45.

In subscriber information database 600 shown in the figure, "PS" positioned at the start of the subscriber ID indicates a subscriber ID of the positional information service provided by positional information service server 45, while "AS" indicates a subscriber ID of the existing positional information service. Further, a field "communication address of measuring center" subscriber is provided in information database 600. This field stores the network address of measuring center 50 for the subscriber information of the positional information service provided by positional information service server 45. Further, it stores the telephone number of measuring center 51 for subscriber information of the existing positional information service. Note that it is of course possible to store an IP address or other network address as the communication address of measuring center 51.

Note that while illustration is omitted, positional information service server 45 according to the fourth modification has a measuring system database storing all measuring systems able to measure the position of the mobile unit for each mobile unit 10, 20, and 30 subscribing to the positional information service provided by positional information service server 45, and for mobile units 110 subscribing to the existing positional information service.

Figure 30:
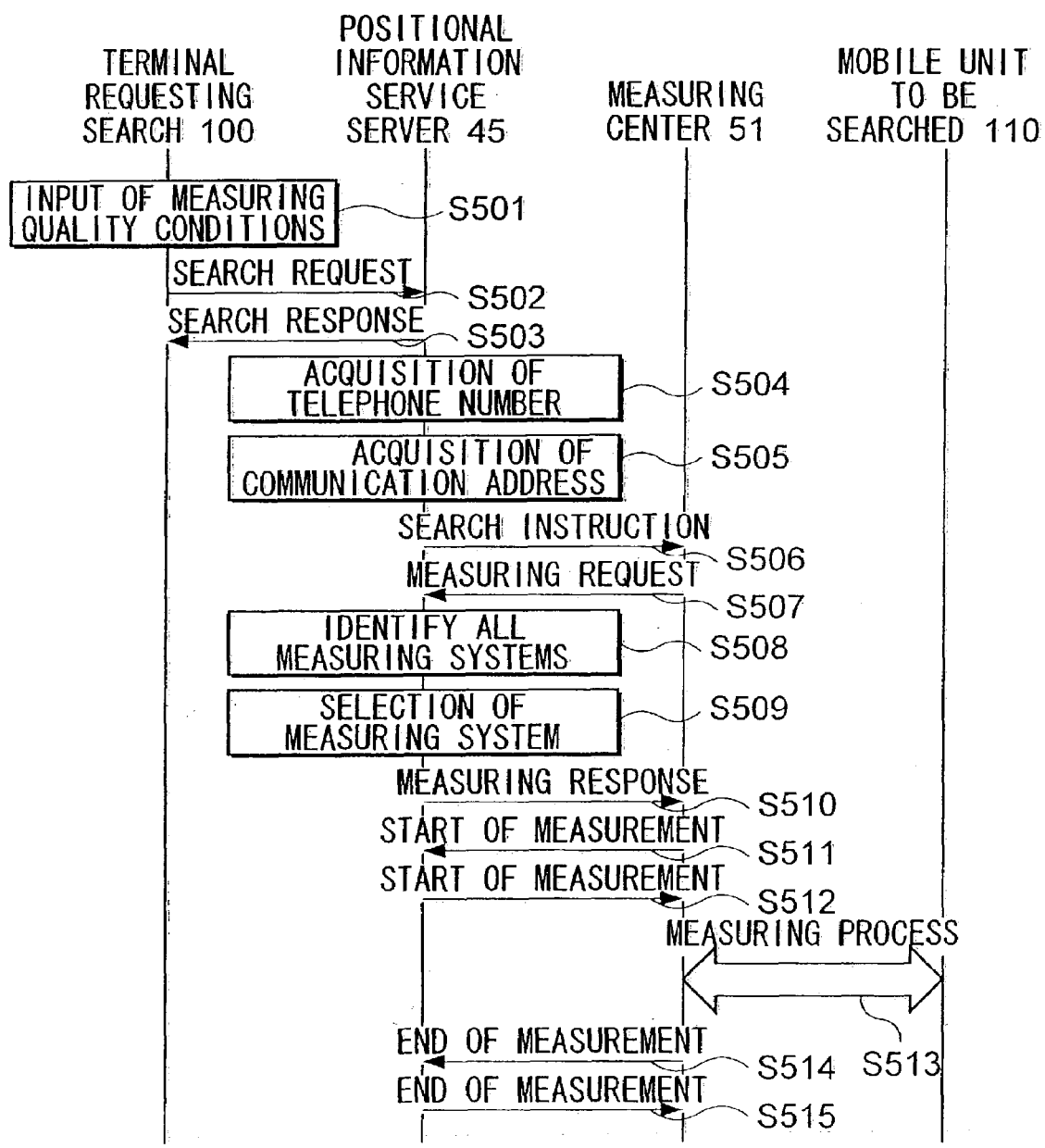
FIG. 30 is a sequence chart explaining the operation of devices when executing a search function in a communication system according to the fourth modification.

Next, FIG. 30 is a sequence chart of the case of executing a search function in the communications system according to the fourth embodiment. Note that here the case of acquiring the positional information of a mobile unit 110 subscribing to the existing positional information service will be explained.

As shown in the figure, first, terminal 100 requesting the search executes processing for prompting the user to input the measuring quality conditions (step S501). Next, terminal 100 requesting the search transmits a search request to positional information service server 45 (step S502). This search request includes an instruction instructing a search, the subscriber ID of the unit requesting the search, subscriber information identifying mobile unit 110 to be searched, subscriber information identifying the terminal to be notified, measuring quality conditions input at step S501, etc.

Positional information service server 45 transmits a search response back to terminal 100 requesting the search in response to the search request (step S503). Next, positional information service server 45 searches through subscriber information database 600, as a key that the subscriber information identifying mobile unit 110 to be searched included in the received search request, and acquires the telephone number of the mobile unit 110 to be searched (step S504). Further, positional information service server 45 acquires the telephone number of measuring center 51 from subscriber information database 600 (step S505). Next, positional information service server 45 transmits a search instruction including an instruction instructing a search, the telephone number of the mobile unit 110 to be searched, etc. to measuring center 51 (step S506).

Here, the measuring center 51 has function of operating like mobile unit 110 to be searched, more specifically, the function of operating like a terminal to be searched, subscribing to the positional information service, provided by positional information service server 45. When receiving a search instruction from positional information service server 45, measuring center 51 transmits a measuring request to positional information service server 45 (step S507).

When receiving a measuring request from measuring center 51, positional information service server 45 first refers to the measuring system database, and identifies all measuring systems able to measure the position of the mobile unit 110 to be searched (step S508). Next, positional information service server 45 selects the measuring system most suitable for the measuring quality conditions received from terminal 100 requesting the search, among all identified measuring systems (step S509). Next, positional information service server 45 transmits a measuring response including information relating to the selected measuring system, to measuring center 51 (step S510).

When receiving the measuring response from positional information service server 45, measuring center 51 transmits the measuring start instruction to positional information service server 45 (step S511). Further, in response to this, positional information service server 45 transmits a measuring start instruction to measuring center 51 (step S512). When receiving the measuring start instruction from positional information service server 45, measuring center 51 acquires the positional information of mobile unit 110 to be searched by the quasi-measuring system or actual measuring system in accordance with the designated measuring system (step S513).

Next, when the measuring is completed, measuring center 51 includes the acquired positional information in the measuring end notification, then transmits it to positional information service server 45 (step S514). Further, in response to this, positional information service server 45 transmits the measuring end notification to measuring center 51 (step S515). Next, positional information service server 45 executes processing for registration of the positional information included in the measuring end notification received from measuring center 51, processing for notification to the designated terminal to be notified, etc.

Note that positional information service server 45 can refer to subscriber information database 600 to determine that the place transmitting the search instruction to be transmitted at step S506 is not an actual terminal to be searched, but measuring center 51 of the existing positional information provision system. When the search instruction is transmitted from positional information service server 45 to measuring center 51 in this way, it is also possible that positional information service server 45 does not transmit to the measuring center 51, the measuring start instruction at step S512 and the measuring end instruction at step S515.

As explained above, according to this modification, positional information service server 45 can link up with an existing positional information provision system, and acquire the positional information of a mobile unit 110 subscribing to the existing positional information service by a simple configuration.

<Fifth Modification>

In the above embodiment, the following control is executed when mobile unit 10, 20, or 30 to be measured has the function of measuring the position of its own unit 10, 20, or 30 (hereinafter called an "independent measuring function").

In this modification, however, assume the positional information provision system comprised of positional information service server 45, measuring center 50, positional information conversion apparatus 60, etc. has the configuration shown in FIG. 28; and can link up with an existing positional information provision system, and acquire positional information of a mobile unit subscribing to the existing positional information service. Therefore, assume positional information service server 45 of this modification has a subscriber information database 600 shown in FIG. 29, and has a measuring system database storing all measuring systems able to measure the position of the mobile unit for each mobile unit 10, 20, or 30 subscribing to the positional information service provided by positional information service server 45, and for each mobile unit 110 subscribing to the existing positional information service.

Figure 31:
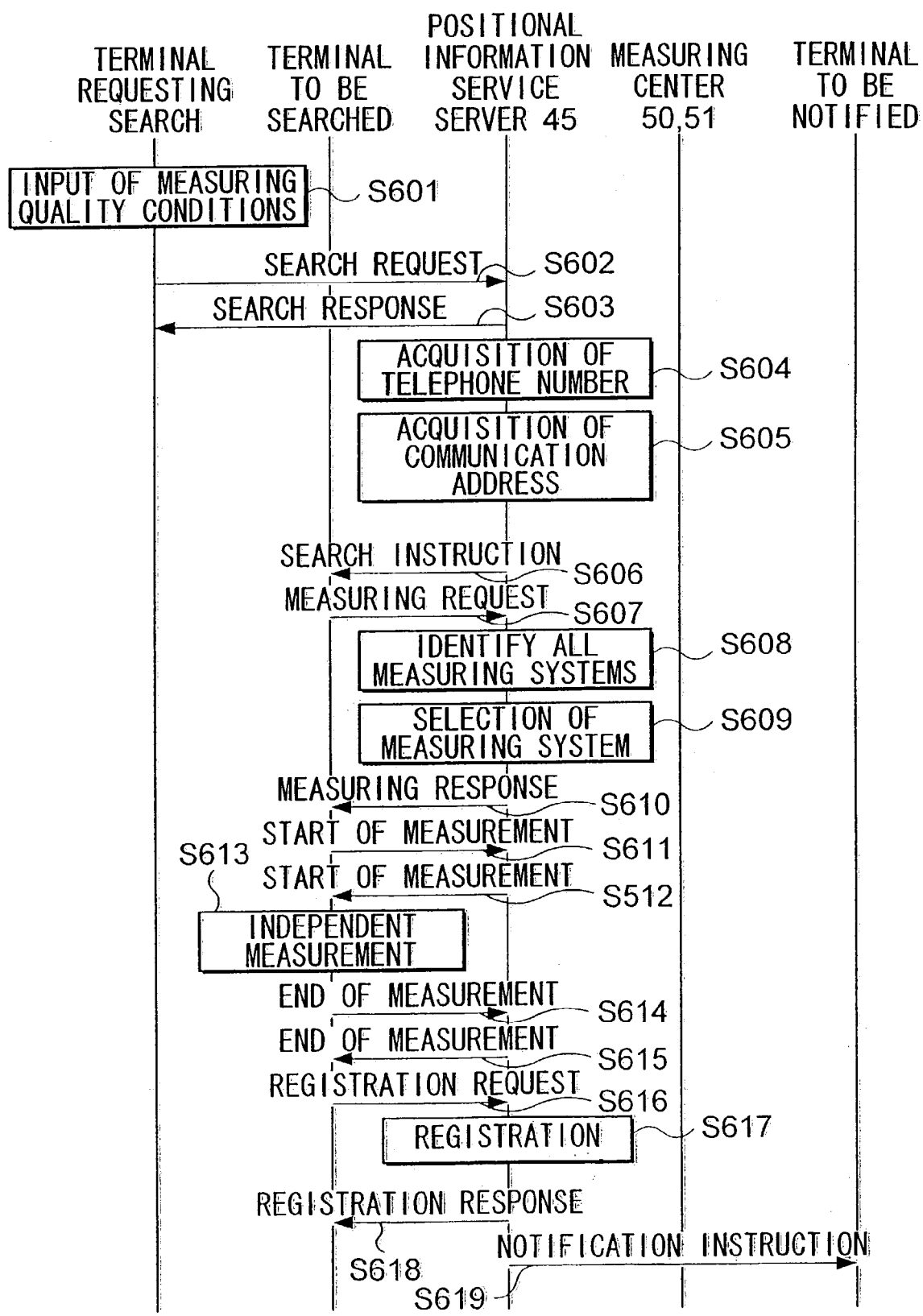
FIG. 31 is a sequence chart showing the operation of devices when acquiring the positional information of a mobile unit having an independent measuring function according to a fifth modification of the present invention.

FIG. 31 is a sequence chart of the case of acquisition of the positional information of a mobile unit 10, 20, or 30 having a self measuring function. Note that in this modification, the explanation will be given about the case, using a search function to acquire positional information of a mobile unit 10, 20, or 30 subscribing to the positional information service provided by positional information service server 45.

As shown in the figure, firstly, the terminal requesting the search executes processing for prompting the user to input the measuring quality conditions (step S601). Next, the terminal requesting the search transmits a search request to positional information service server 45 (step S602). This search request includes an instruction instructing a search, the subscriber ID of the unit requesting the search, subscriber information identifying mobile unit 10, 20, or 30 to be searched, subscriber information identifying the terminal to be notified, measuring quality conditions input at step S601, etc.

Positional information service server 45 transmits a search response to the terminal requesting the search in response to the receipt of a search request (step S603). Next, positional information service server 45 searches through subscriber information database 600, as a key that the subscriber information of mobile unit 10, 20, or 30 to be searched included in the received search request, and acquires the telephone number of mobile unit 10, 20, or 30 to be searched (step S604). Further, positional information service server 45 acquires the telephone number of measuring center 50 from subscriber information database 600 (step S605). Next, positional information service server 45 transmits a search instruction to mobile unit 10, 20, or 30 to be searched (step S606). By receipt of this search instruction, the user of mobile unit 10, 20, or 30 to be searched can confirm that the own position is being searched by a third party.

When the search by the third party is authorized by the user, mobile unit 10, 20, or 30 to be searched transmits a measuring request to positional information service server 45 (step S607). In response to this, positional information service server 45 firstly refers to the measuring system database, and identifies all of the measuring systems able to measure position of mobile unit 10, 20, or 30 to be searched (step S608). Next, positional information service server 45 selects the measuring system most suitable for the measuring quality conditions received from the terminal requesting the search, among all of the identified measuring systems (step S609).

Note that in this modification, the explanation is made about the case where mobile unit 10, 20, or 30 to be searched has a self measuring function and mobile unit 10, 20, or 30 to be searched, and measures the position of its own unit 10, 20, or 30 by this self measuring function. Therefore, at step S609, the independent measuring system is selected by positional information service server 45 as the measuring system.

After selecting the measuring system, positional information service server 45 transmits a measuring response including the information relating to the selected measuring system, to the mobile unit 10, 20, or 30 to be searched (step S610). By the receipt of this measuring response, the user of mobile unit 10, 20, or 30 to be searched can confirm the measuring system of positional information of its own unit acquired by a third party. Note that at step S610, positional information service server 45 can also be configured to transmit a measuring response including information relating to the selected measuring system, to the terminal requesting the search as well. With this configuration, the user of the terminal requesting the search can also confirm the measuring system to be used.

When the measuring system is authorized by the user, mobile unit 10, 20, or 30 to be searched transmits a measuring start instruction back to positional information service server 45 (step S611). Further, in response to this, positional information service server 45 transmits the measuring start instruction to the mobile unit 10, 20, or 30 to be searched (step S612). Note that when the measuring system selected by positional information service server 45 at step S609 is not the independent measuring system, for example, when it is the base station ID system or sector ID system, at step S612, positional information service server 45 transmits a measuring start instruction to corresponding measuring centers 50 and 51 in accordance with the telephone number (communication address) acquired at step S605.

When receiving a measuring start instruction from positional information service server 45, mobile unit 10, 20, or 30 to be searched executes the independent measuring and acquires the positional information of its own unit 10, 20, or 30 (step S613). Next, mobile unit 10, 20, or 30 to be searched includes the acquired positional information in a measuring end notification, then transmits it back to positional information service server 45 (step S614). Further, in response to this, positional information service server 45 transmits the measuring end notification back to mobile unit 10, 20, or 30 to be searched (step S615).

Next, at steps S616 to S619, positional information service server 45 executes processing for registering the positional information based on the registration request from mobile unit 10, 20, or 30 to be searched, processing for notifying the designated terminal to be notified, etc. The processing from steps S616 to S619 is the same as the processing from steps S74 to 77 of the sequence chart shown in FIG. 17, so an explanation will be omitted.

Note that when the positional information of mobile unit 10, 20, or 30 to be searched can be acquired by positional information service server 45 without using measuring centers 50 and 51 like the independent measuring system, it is also possible not to transmit the measuring start instruction at step S612, and the measuring end instruction at step S615 to the mobile unit 10, 20, or 30 to be searched.

Further, in the sequence chart shown in FIG. 31, positional information service server 45 may also be configured to register the positional information of mobile unit 10, 20, or 30 to be searched, the subscriber ID, etc. included in the measuring end notification immediately, in positional information registration database 455 after receiving the measuring end notification from mobile unit 10, 20, or 30 to be searched at step S614. In this case, the processing of step S616 and S618 become unnecessary.

<Sixth Modification>

In the above embodiment, the registration function may also be configured to execute the following control.

Figure 32:
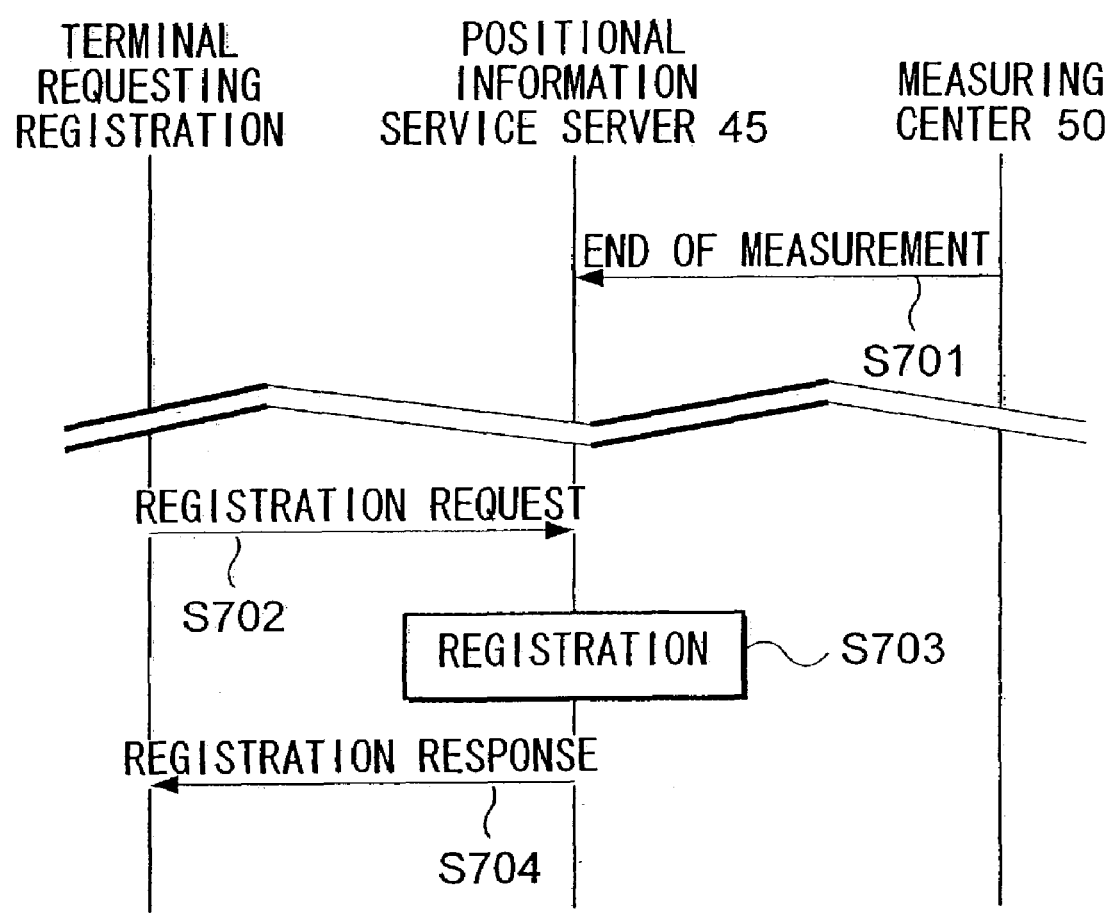
FIG. 32 is a sequence chart showing a modification of the registration function shown in FIG. 10 according to a sixth modification of the present invention.

FIG. 32 is a sequence chart showing a modification of the registration function shown in FIG. 10. As shown in the figure, before the registration processing, a measuring end notification is transmitted from the measuring center 50 etc. to the positional information service server 45 (step S701). This measuring end notification includes the positional information of mobile unit 10, 20, or 30 to be measured, the subscriber ID of mobile unit 10, 20, or 30, etc. That is, positional information service server 45 acquires the positional information already to be registered, and the subscriber ID of mobile unit 10, 20, or 30 to be registered at the point of time when receiving the measuring end notification from measuring center 50 etc.

Therefore, when registering the positional information of mobile unit 10, 20, or 30 included in the measuring end notification at step S701, in positional information database 455, the registration request transmitted from the terminal requesting registration to positional information service server 45 at step S702 does not have to include the positional information to be registered.

That is, the terminal requesting registration transmits a registration request including the instruction instructing registration, the subscriber ID of the unit request registration, etc. without the positional information to be registered, to positional information service server 45 (step S702). Further, when receiving a registration request, positional information service server 45 registers the positional information of mobile unit 10, 20, or 30 to be measured, the subscriber ID of mobile unit 10, 20, or 30, etc. included in the measuring end request received at step S701, in positional information registration database 455 (step S703), and transmits the registration response to the terminal requesting registration (step S704). In this way, the registration request transmitted from the terminal requesting the registration to positional information service server 45 need not include the positional information.

<Seventh Modification>

In the above embodiment, the network to which terminal 80 or IP server 90 etc. are connected is not limited to the Internet 70. For example, it may also be an Intranet or LAN (Local Area Network) etc. Further, in the above embodiment, terminal 80 or IP server 90 may also be configured to access positional information service server 45 through a dedicated line or a telephone line. Further, the invention may also be configured to have the function of the positional information service executed by a gateway server 40, in place of being executed by positional information service server 45. Further, it may also be configured to have the function by executed positional information service server 45, in place of being executed by measuring center 50, or by positional information conversion apparatus 60 executed.

<Eighth Modification>

In the above embodiment, the mobile unit covered to be measured was a PHS terminal or a mobile phone, but the invention is not limited to this. It may also be a PDA (Personal Digital Assistant) or mobile computer, car navigation system, or other mobile communication terminal which can communicate wirelessly between a base station of a mobile communications network and wireless LAN.

The invention claimed is:

1. A positional information providing apparatus comprising:
    receiving means for receiving, from a mobile communication terminal requesting measurement, identification information identifying the mobile communication terminal that is to be measured, and measuring quality conditions indicating conditions regarding the quality of the measurement;
    selecting means for selecting a measuring system suitable for said received measuring quality conditions from among a plurality of measuring systems able to measure position of the mobile communication terminal identified by said received identification information;
    acquiring means for acquiring the positional information of said mobile communication terminal based on the measuring system selected by said selecting means; and
    transmitting means for transmitting positional information acquired by said acquiring means to a terminal designated to be notified.

2. The positional information providing apparatus as set forth in claim 1,
    wherein said acquiring means causes a measuring means for measuring a position of a mobile communication terminal to measure position of the mobile communication terminal identified by said identification information by a measuring system selected by said selecting means, and acquires positional information of said mobile communication terminal measured by said measuring means.

3. The positional information providing apparatus as set forth in claim 1,
    wherein said acquiring means acquires positional information linked with measuring system selected by said selecting means, and identification information received by said receiving means from storage means, storing positional information acquired by measuring position of the mobile communication terminal, linked with the measuring system of positional information and identification information of said mobile communication terminal.

4. The positional information providing apparatus as set forth in claim 1,
    wherein said mobile communication terminal that is to be measured is provided with measuring means for measuring its own position; and
    wherein said acquiring means causes measuring means of said mobile communication terminal that is to be measured to measure its own position by a measuring system selected by said selecting means, and acquires positional information of said mobile communication terminal measured by the measuring means.

5. The positional information providing apparatus as set forth in claim 1,
    wherein responding means for transmitting the measuring system selected by said selecting means back to said terminal requesting measurement is further provided.

6. A positional information providing apparatus comprising:
    receiving means for receiving, from a mobile communication terminal requesting measurement, identification information identifying the mobile communication terminal that is to be measured, and measuring quality conditions indicating conditions regarding the quality of the measurement;
    setting means for setting a priority order using measuring systems based on said received measuring quality conditions for a plurality of measuring systems able to measure the position of the mobile communication terminal identified by said received identification information;
    acquiring means for acquiring the positional information of said mobile communication terminal based on a measuring system in order from the measuring system with the highest priority order set by said setting means and, when the positional information cannot be acquired, acquiring the positional information of said mobile communication terminal based on the measuring system with the next highest priority order; and
    transmitting means for transmitting positional information acquired by said acquiring means, to a terminal designated to be notified.

7. The positional information providing apparatus as set forth in claim 6,
    wherein responding means for transmitting the plurality of measuring systems able to measure the position of the mobile communication terminal and the priority order set by said setting means for the plurality of measuring systems back to said terminal requesting the measurement, is further provided.

8. The positional information providing apparatus as set forth in claim 1 or 6,
    wherein said measuring quality conditions are at least one of conditions relating to a range of measuring times, a condition relating to precision of measuring, a condition relating to a rate billed along with the measurement, and a condition relating to time required for measuring in any combination.

9. The positional information providing apparatus as set forth in claim 1 or 6,
    wherein when there are a plurality of said measuring quality conditions, a priority order indicating the relative importance of the conditions is set.

10. The positional information providing apparatus as set forth in claim 1 or 6, wherein the mobile communication terminal to be measured, is said terminal requesting the measurement.

11. The positional information providing apparatus as set forth in claim 1 or 6,
wherein the designated terminal to be notified is said terminal requesting the measurement.

12. The positional information providing apparatus as set forth in claim 1 or 6,
wherein the designated terminal as to be notified is a communication apparatus receiving positional information transmitted by said transmitting means, and providing position related information relating to the position indicated by the positional information, to said mobile communication terminal.

13. A positional information providing method comprising
a receiving step in which positional information providing apparatus receives, from a mobile communication terminal requesting measuring, identification information identifying the mobile communication terminal that is to be measured, and measuring quality conditions indicating conditions regarding the quality of the measurement;
a selecting step in which said positional information providing apparatus selects a measuring system suitable for the measuring quality conditions received at said receiving step from among a plurality of measuring systems able to measure the position of the mobile communication terminal identified by the identification information received at said receiving step;
an acquiring step in which said positional information providing apparatus acquires the positional information of said mobile communication terminal based on the measuring system selected by said selecting step; and
a transmitting step in which said positional information providing apparatus transmits positional information acquired by said acquiring step to a terminal designated to be notified.

14. A positional information providing method comprising:
a receiving step in which a positional information providing apparatus receives, from a mobile communication terminal requesting measuring, identification information identifying the mobile communication terminal that is to be measured, and measuring quality conditions indicating conditions regarding the quality of the measurement;
a setting step in which said positional information providing apparatus sets a priority order using measuring systems based on the measuring quality conditions received at said receiving step for a plurality of measuring systems able to measure the position of the mobile communication terminal identified by said received identification information;
an acquiring step in which said positional information providing apparatus acquires the positional information of said mobile communication terminal based on a measuring system in order from the measuring system with the highest priority order set by said setting step and, when the positional information cannot be acquired, acquiring the positional information of said mobile communication terminal based on the measuring system with the next highest priority order; and
a transmitting step in which said positional information providing apparatus transmits positional information acquired by said acquiring step to a designated terminal to be notified.

15. The positional information providing apparatus according to claim 1, further comprising storing means for storing one or more measuring systems in association with identification information of each mobile communication terminal; and
wherein the selecting means selects a measuring system suitable for said received measuring quality conditions, from said one or more measuring systems stored in said storing means in association with said received identification information.

16. The positional information providing method according to claim 13, further comprising a storing step in which said position information providing apparatus stores in measuring system database one or more measuring systems in association with identification information of each mobile communication terminal; and
wherein the selecting step includes selecting a measuring system suitable for said received measuring quality conditions, from said one or more measuring systems stored in said measuring system database in association with said received identification information.

17. The positional information providing apparatus as set forth in claim 1,
wherein the selecting means selects only a single measuring system from the plurality of measuring systems, in response to the received measuring quality conditions; and
wherein the acquiring means acquires the positional information only from the single measuring system.

18. The positional information providing apparatus as set forth in claim 1, wherein receiving means receives from the mobile communication terminal information indicative of the mobile terminal requesting measurement.

19. The positional information providing apparatus as set forth in claim 1, wherein the measuring quality conditions are input to the mobile communication terminal by a user.

20. The positional information providing apparatus as set forth in claim 19, wherein the measuring quality conditions are input through an input screen for the mobile communication terminal.

21. The positional information providing apparatus as set forth in claim 1, wherein the measuring quality conditions relate to billing accompanying measurement.

22. The positional information providing apparatus as set forth in claim 1, wherein the measuring quality conditions relate to waiting time to acquire the measuring result.

23. The positional information providing apparatus as set forth in claim 1, wherein the selecting means selects the measuring system based on the received measuring quality conditions and based on at least one aspect of the mobile communication terminal.

24. The positional information providing apparatus as set forth in claim 23, wherein the at least one aspect of the mobile communication terminal comprises whether the mobile communication terminal includes a GPS receiver.

25. The positional information providing apparatus as set forth in claim 1, wherein the measuring quality conditions are received along with the request for measurement.

26. The positional information providing apparatus as set forth in claim 1, wherein the measuring quality conditions are received in advance of the request for measurement.

27. The positional information providing apparatus as set forth in claim 6, wherein the measuring quality conditions are input to the mobile communication terminal by a user.

28. The positional information providing apparatus as set forth in claim 6, wherein the measuring quality conditions relate to billing accompanying measurement.

29. The positional information providing method according to claim 13, wherein the measuring quality conditions are input to the mobile communication terminal by a user.

30. The positional information providing method according to claim 14, wherein the measuring quality conditions are input to the mobile communication terminal by a user.

* * * * *